US007308573B2

(12) United States Patent
Kostal et al.

(10) Patent No.: US 7,308,573 B2
(45) Date of Patent: Dec. 11, 2007

(54) ENROLLING / SUB-ENROLLING A DIGITAL RIGHTS MANAGEMENT (DRM) SERVER INTO A DRM ARCHITECTURE

(75) Inventors: Gregory Kostal, Kirkland, WA (US); Steve Bourne, Seattle, WA (US); Vinay Krishnaswamy, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 10/373,458

(22) Filed: Feb. 25, 2003

(65) Prior Publication Data

US 2004/0168061 A1    Aug. 26, 2004

(51) Int. Cl.
*H04L 9/00* (2006.01)
(52) U.S. Cl. ............... 713/156; 713/175; 713/155; 380/229; 705/67
(58) Field of Classification Search ............... 713/155, 713/156
See application file for complete search history.

(56) References Cited

U.S. PATENT DOCUMENTS

| | | | | |
|---|---|---|---|---|
| 5,715,403 | A | 2/1998 | Stefik | 395/244 |
| 7,047,404 | B1* | 5/2006 | Doonan et al. | 713/156 |
| 2002/0002674 | A1 | 1/2002 | Grimes et al. | 713/156 |
| 2002/0157002 | A1* | 10/2002 | Messerges et al. | 713/155 |
| 2002/0194474 | A1* | 12/2002 | Natsuno et al. | 713/168 |

FOREIGN PATENT DOCUMENTS

| | | |
|---|---|---|
| EP | 0 907 120 A2 | 4/1999 |
| NZ | 286 668 | 10/1996 |
| WO | WO 00/21239 | 4/2000 |
| WO | WO 00/42492 | 7/2000 |
| WO | WO 00/58811 | 10/2000 |
| WO | WO 00/59150 | 10/2000 |
| WO | WO 01/22268 A2 | 3/2001 |
| WO | WO 01/22651 A2 | 3/2001 |
| WO | WO 01/33867 A2 | 5/2001 |
| WO | WO 01/52021 A1 | 7/2001 |

OTHER PUBLICATIONS

Schneier, Bruce; Applied Cryptography, 1996, John Wiley & Sons, Inc., 2nd Edition, pp. 574-575.*

(Continued)

*Primary Examiner*—Kambiz Zand
*Assistant Examiner*—Roderick Tolentino
(74) *Attorney, Agent, or Firm*—Woodchuck Washburn LLP

(57) ABSTRACT

A Digital Rights Management (DRM) system has a plurality of DRM servers performing DRM functionality and an entering DRM-E server is enrolled into the system by an enrolling DRM-R server such that the entering DRM-E server is to be trusted within the system. The DRM-E server sends an enrollment request to the DRM-R server including a proffering identification and a public key (PU-E). The DRM-R server validates the proffering identification, and, if the request is to be honored, generates a digital enrollment certificate with (PU-E) for the DRM-E server to enroll such DRM-E server into the DRM system. The now-enrolled DRM-E server with the generated enrollment certificate is able to employ same to issue DRM documents within the DRM system.

71 Claims, 17 Drawing Sheets

OTHER PUBLICATIONS

Evans, P. "DRM: Is the Road to Adoption Fraught with Potholes?" *Seybold Reporting Analyzing Publishing Technologies,* 2001, 1(14), 32.

Fowler, T.B. "Technology's Changing Role in Intellectual Property Rights", *It professional (IEEE ),* 2002, 4(2), 39-44.

Gable, J. "The Digital Rights Conundrum", *Transform Magazine,* 2001, 10(11), 27.

Griswold, G.N. "A Method for Protecting Copyright on Networks", *IMA Intell. Property Project Proceedings,* Jan. 1994, 1(1), 169-178.

Gunter, C.A., et al. "Models and Languages for Digital Rights", *Proceedings of the 34th Annual Hawaii International Conference on System Sciences,* 2001, 5.

Kahn, R.E. "Deposit, Registration and Recordation in an Electronic Copyright Management System", *IMA Intellectual Property Project Proceedings,* Jan. 1994, 1(1), 111-120.

Peinado, M. "Digital rights management in a multimedia environment", *SMPTE Journal,* 2002, 111(3), 159-163.

Royan, B. Content creation and rights management; experiences of SCRAN(the Scottish Cultural Resources Access Network), *Program,* 2000, 34(2), 131-142.

Valimaki, M. et al., "Digital rights management on open and semi-open networks", *WIAPP,* 2001, 154-155.

Yu, H. "Digital multimedia at home and content rights management", *IEEE Proceedigns 2002 IEEE 4th International Workshop on Networked Appliances,* 2002, 49-56.

"Managing digital rights in online publishing", *Information Management & Technology,* 2001, 34(4), 168-169.

Hwang, C. et al., "Protection of Digital Contents on Distributed Multimedia Environment", *Proceedings of the IASTED International Conference, Internet and Multimedia Systems and Applications,* Nov. 19-23, 2000, Las Vegas, Nevada, USA, pp. 127-132.

Hong, S. et al., "On the construction of a powerful distributed authentication server without additional key management", *Computer Communications,* 2000, 23,1638-1644.

Managing Digital Rights in Online Publishing, "How two publishing houses maintin control of copyright" *Information Management & Technology, 2001,* 34(4), 168-169.

Jakobsson, M. et al., "Proprietary Certificates", Topics in Cryptology, 2002, 164-181.

Kumik, P. "Digital Rights Management", *Computers and Law,* 2000, 11(4), 14-15.

Torrubia, A. et al., "Cryptography regulations for E-commerce and digital rights management", *Computers & Security,* 2001, 20(8), 724-738.

Zwollo, K. "Digital document delivery and digital rights management", *Information Services & Use,* 2001, 9-11.

"InternetX.509 Public Key Infrastructure: Roadmap", PKIX Working Group Internet Draft, Jul. 2002, 1-55, XP-002284790.

"Internet X.509 Public Key Infrastructure Certificate Management Protocols", Internet Engineering Task Force, Network Working Group, Mar. 1999, 1-72, XP-002284791.

International Telecommunication Union, ITU-T Telecommunication Standardization Sector of ITU, "The Directory Public-Key Attribute Certificate Frameworks", Mar. 2000, XP-002284793.

"Certificate Management Messages over CMS", Internet Engineering Task Force, Network Working Group, Apr. 2000, 1-47, XP-002284794.

Myers, M. et al., "Internet X.509 Certificate Request Message Format", Internet X.509, Mar. 1999, http://www.rfc.net/rfc2511.html, 24 pages.

\* cited by examiner

| SRL 308 | CONTENT INFO | DRM SERVER INFO | -(PU-DRM(K2)) | -REFERRAL INFO | --URL | --FALL-BACK | RIGHTS LABEL INFO | (K2(RIGHTSDATA)) | (K2(CK)) | S (PR-DRM) |

FIG. 4A

ENROLLING / SUB-ENROLLING A DIGITAL RIGHTS MANAGEMENT (DRM) SERVER INTO A DRM ARCHITECTURE

CROSS-REFERENCE TO RELATED APPLICATIONS

The following U.S. Patent Applications disclose subject matter that is related to the subject matter of the present application, and are hereby incorporated herein by reference in their entirety:

U.S. patent application Ser. No. 10/185,527, filed Jun. 28, 2002 entitled "Obtaining a Signed Rights Label (SRL) for Digital Content and Obtaining a Digital License Corresponding to the Content Based on the SRL in a Digital Rights Management System";

U.S. patent application Ser. No. 10/185,278, filed Jun. 28, 2002 entitled "Using a Rights Template to Obtain a Signed Rights Label (SRL) for Digital Content in a Digital Rights Management System";

U.S. patent application Ser. No. 10/185,511, filed Jun. 28, 2002 entitled "Systems And Methods For Issuing Usage Licenses For Digital Content And Services";

U.S. patent application Ser. No. 10/364,627, filed Feb. 11, 2003 entitled "Publishing Digital Content Within an Organization in Accordance with a Digital Rights Management (DRM) System;

U.S. patent application Ser. No. 10/364,115, filed Feb. 11, 2003 entitled "Publishing Digital Content Within an Organization in Accordance with a Digital Rights Management (DRM) System; and U.S. patent application Ser. No. 10/364,621, filed Feb. 25, 2003 concurrently with the present application entitled "Issuing a Publisher Use License Off-Line in a Digital Rights Management (DRM) System".

TECHNICAL FIELD

This invention relates to a digital rights management (DRM) system. More particularly, the invention relates to employing a DRM system to publish digital content in an organization such as an office or corporation or the like such that rendering and use of the content within the organization may be constrained according to corresponding use or license terms. Even more particularly, the present invention relates to a network of DRM servers that effectuate such DRM system and a method of enrolling or sub-enrolling a DRM server into the network.

BACKGROUND OF THE INVENTION

Digital rights management and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders or 'plays' the digital content with the aid of an appropriate rendering device such as a media player on a personal computer or the like.

In one scenario, a content owner or rights-owner such as an author, a publisher, a broadcaster, etc., wishes to distribute such digital content to each of many users or recipients in exchange for a license fee or some other consideration. In such scenario, then, the content may be a song, an album of songs, a movie, etc., and the purpose of the distribution is to generate the license fees. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be played only a limited number of times, only for a certain total time, only on a certain type of machine, only on a certain type of media player, only by a certain type of user, etc.

In another scenario, a content developer, such as an employee in or member of an organization, wishes to distribute such digital content to one or more other employees or members in the organization or to other individuals outside the organization, but would like to keep others from rendering the content. Here, the distribution of the content is more akin to organization-based content sharing in a confidential or restricted manner, as opposed to broad-based distribution in exchange for a license fee or some other consideration.

In such scenario, then, the content may be a document presentation, spreadsheet, database, email, or the like, such as may be exchanged within an office setting, and the content developer may wish to ensure that the content stays within the organization or office setting and is not rendered by non-authorized individuals, such as for example competitors or adversaries. Again, such content developer wishes to restrict what a recipient can do with such distributed digital content. For example, the content owner would like to restrict the user from copying and re-distributing such content to a second user, at least in a manner that exposes the content outside the bounds of individuals who should be allowed to render the content.

In addition, the content developer may wish to provide various recipients with different levels of rendering rights. For example, the content developer may wish to allow protected digital content to be viewable and not printable with respect to one class of individual, and viewable and printable with respect to another class of individual.

However, and in either scenario, after distribution has occurred, such content owner/developer has very little if any control over the digital content. This is especially problematic in view of the fact that practically every personal computer includes the software and hardware necessary to make an exact digital copy of such digital content, and to download such exact digital copy to a write-able magnetic or optical disk, or to send such exact digital copy over a network such as the Internet to any destination.

Of course, as part of a transaction wherein the content is distributed, the content owner/developer may require the user/recipient of the digital content to promise not to re-distribute such digital content in an unwelcome manner. However, such a promise is easily made and easily broken. A content owner/developer may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

A need exists, then, for providing a digital rights management (DRM) and enforcement architecture and method that allows the controlled rendering or playing of arbitrary forms of digital content, where such control is flexible and definable by the content owner/developer of such digital content. More specifically, a need exists for such an architecture that allows and facilitates such controlled rendering, especially in an office or organization environment or the like where documents are to be shared amongst a defined group of individuals or classes of individuals. Even more specifically, a need exists for a method of enrolling approval-granting servers into the architecture.

SUMMARY OF THE INVENTION

The aforementioned needs are satisfied at least in part by the present invention in which a Digital Rights Management (DRM) system has a plurality of DRM servers performing DRM functionality and an entering DRM-E server is enrolled into the system by an enrolling DRM-R server such that the entering DRM-E server is to be trusted within the system. In the invention, the DRM-E server procures a public/private key pair (PU-E, PR-E) for identifying such DRM-E server within the DRM system, procures a proffering identification thereof, and sends an enrollment request to the DRM-R server including the proffering identification and (PU-E).

The DRM-R server validates the proffering identification, and, if the request is to be honored, generates a digital enrollment certificate for the DRM-E server to enroll such DRM-E server into the DRM system. The generated enrollment certificate is based at least in part on (PU-E). The DRM-R server returns the generated enrollment certificate to the requesting DRM-E server and the now-enrolled DRM-E server stores the returned enrollment certificate in an appropriate location for future use. The DRM-E server with the enrollment certificate is able to employ same to issue DRM documents within the DRM system.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 4A is a block diagram showing the structure of a signed rights label as produced by the method of FIG. 4;

DETAILED DESCRIPTION OF THE INVENTION

Computer Environment

Figure 1:
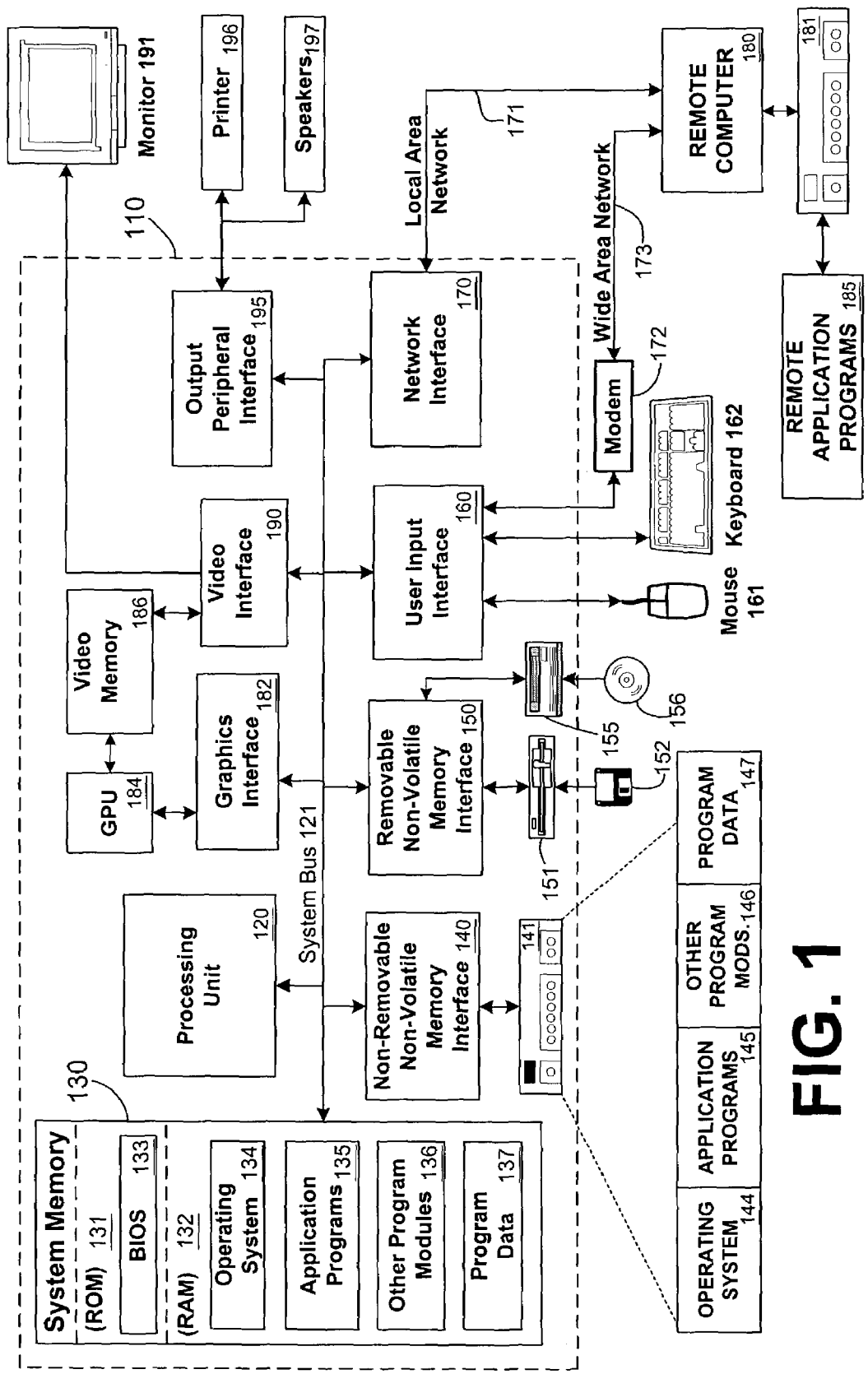
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. A graphics interface 182, such as Northbridge, may also be connected to the system bus 121.

Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
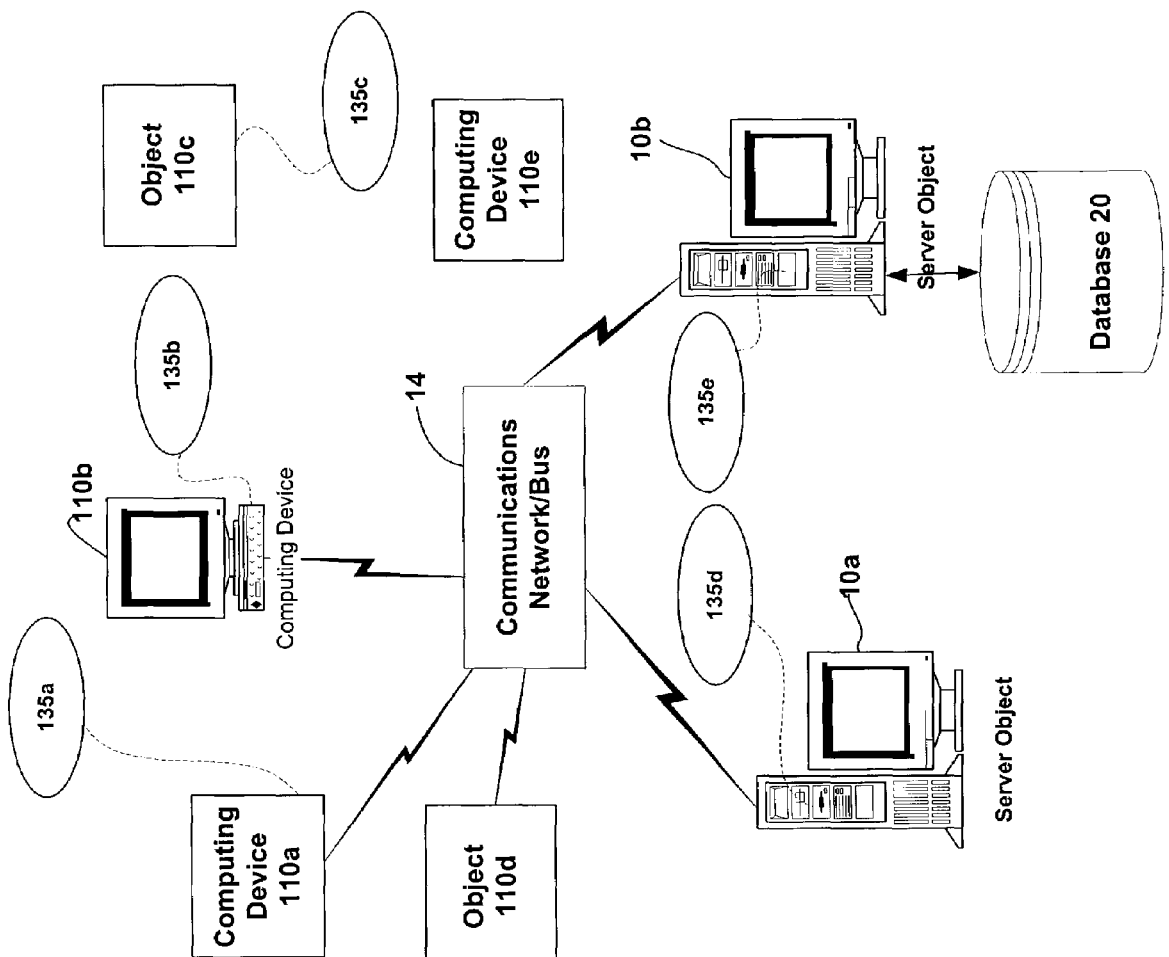
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Digital Rights Management (DRM) Overview

Figure 11:
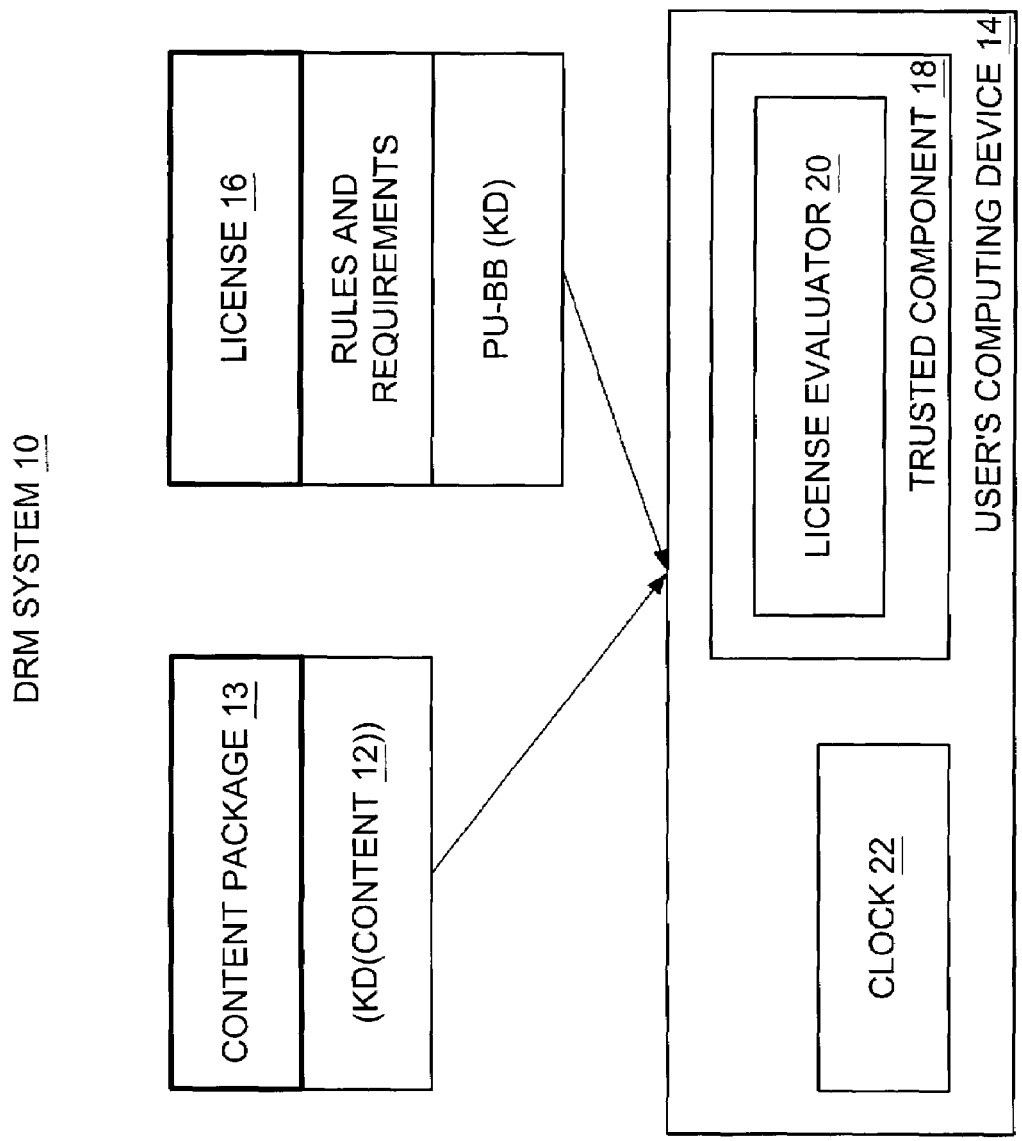
FIG. 11 is a block diagram showing an enforcement architecture of an example of a trust-based system.

As is known, and referring now to FIG. 11, digital rights management (DRM) and enforcement is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner or developer (hereinafter 'owner') distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license or use document (hereinafter 'license') 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD (CONTENT)) from the content package 13 to result in the actual content 12, and the actual content 12 is then in fact rendered.

Publishing Digital Content

Figure 3:
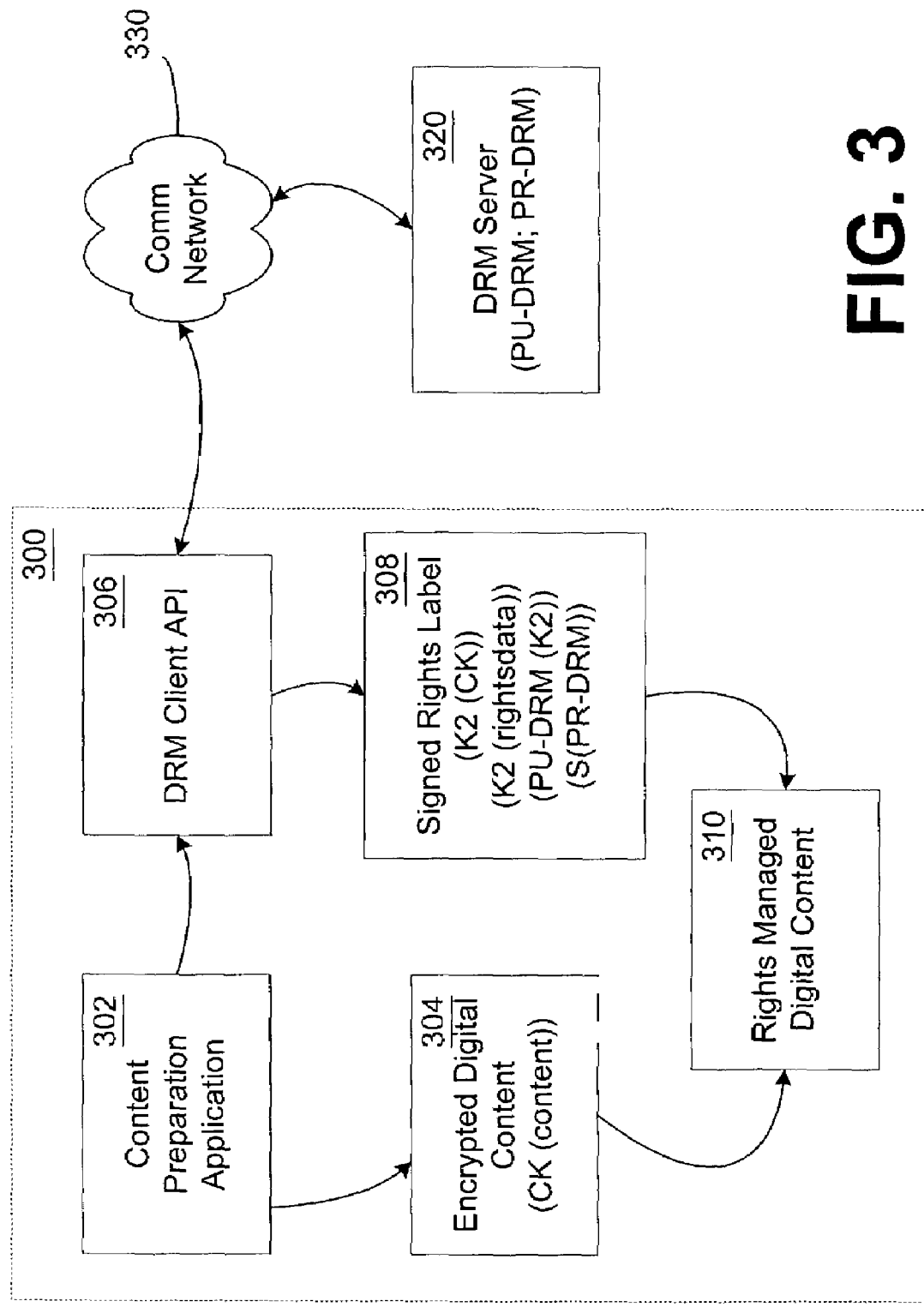
FIG. 3 is a functional block diagram of a preferred embodiment of a system and method according to the invention for publishing digital content.

FIG. 3 is a functional block diagram of a system and method for publishing digital content. "Publishing," as that term is used herein, refers to a process that an application or service follows to establish with a trusted entity a set of rights and conditions that the entity can issue for that content, as well as to whom those rights and conditions can be issued. According to the invention, the publishing process includes encrypting the digital content and associating a list of persistent enforceable rights that the author of the content intended for all possible users of the content. This process can be carried out in a secure way to prohibit access to any of the rights or to the content unless intended by the author of the content.

Three entities in particular are employed to publish secure digital content: a content preparation application 302 that executes on the client 300 and prepares the content for publishing, a digital rights management (DRM) applications program interface (API) 306 that also resides on the client device 300, and a DRM server 320 that is communicatively coupled to the client 300 via a communication network 330 such as the Internet, a local or wide area network, or a combination thereof.

The content preparation application 302 can be any application that produces digital content. For example, the application 302 can be a word processor or other publisher that produces digital text files, digital music, video, or other such content. The content could also include streamed content, such as streamed audio/video of a live or taped event, or example. The application 302 is provided with a cryptographic key to encrypt the digital content, thus forming an encrypted digital content file 304, and the user provides rights data to be tightly associated with the encrypted content in the digital content file 304. The rights data includes an identity for each entity that has rights in the digital content, and a set of rights and conditions for each identified entity.

Such an entity can be, for example, an individual, a class of individuals, or a device. Such rights can include the right to read, edit, copy, print, etc, the digital content. Conditions may include minimum system requirements, date and time limitations, play counts, and the like.

The client API 306 passes the encrypted digital content and the rights data to the DRM server 320. Using a process that is described in detail below, the DRM server 320 determines whether it can enforce the rights data and if so the DRM server 320 signs the rights data to form a signed rights label (SRL) 308. In general, however, any trusted entity can sign the rights data, preferably using a key trusted by the DRM server 320. For example, a client can sign the rights data using a key provided to it by the DRM server 320.

The rights label 308 can include data representing the rights description, the encrypted content key, and the digital signature over the rights description and the encrypted content key. If the DRM server 320 is signing the right label, it passes the signed rights label 308 back to the client through the client API 306, which stores the signed rights label 308 on the client device 300. The content preparation application 302 then associates the signed rights label 308 with the encrypted digital content file 304, such as for example by concatenation to form a rights managed content file 310. Note, though, that the SRL 308 could be stored in a known location separate from the content file 304 with a reference to the SRL 308 concatenated to the content file 304 to form the content file 310.

Figure 4:
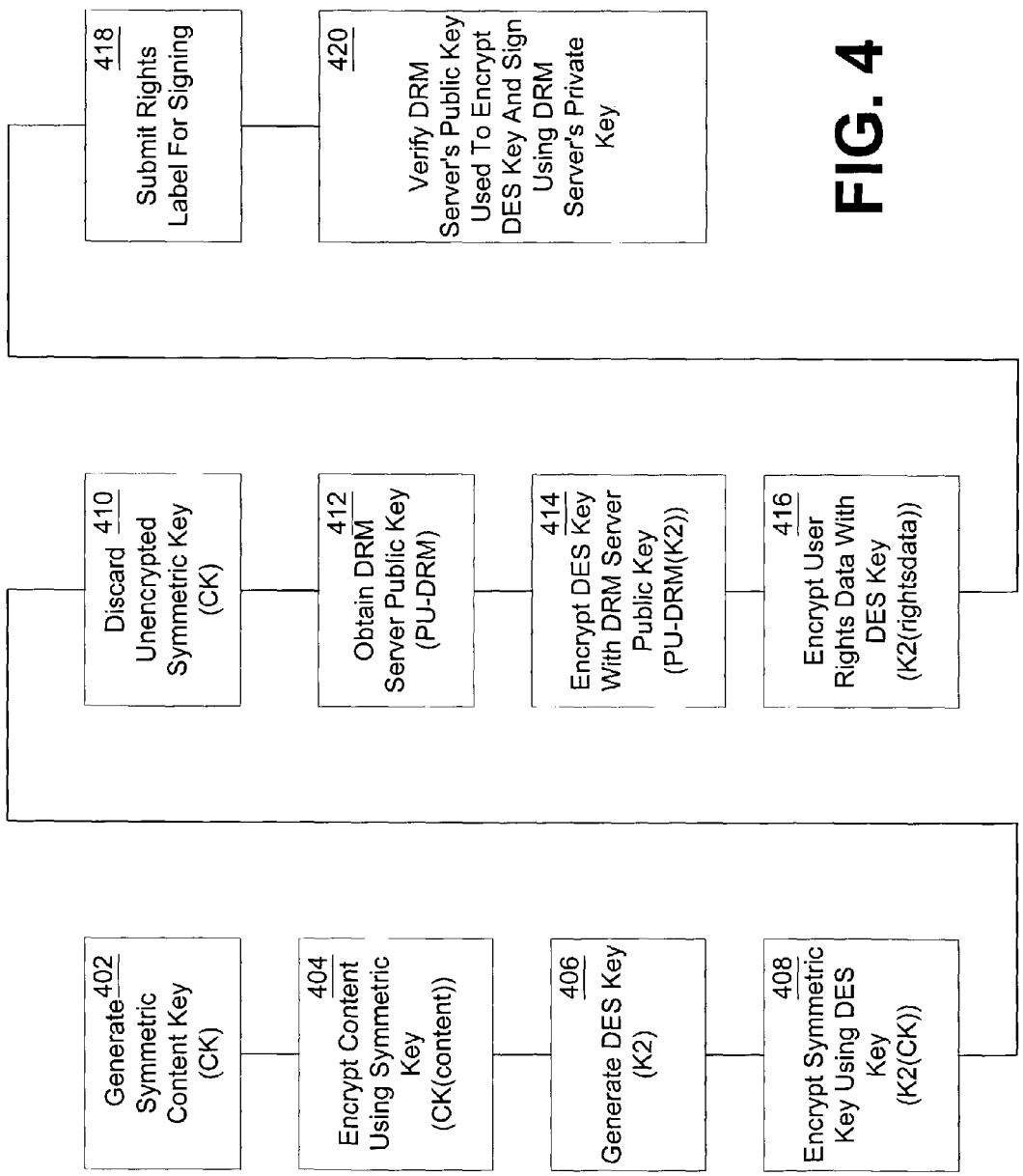
FIG. 4 is a flowchart of a preferred embodiment of a method according to the invention for publishing rights managed digital content.

Referring now to FIG. 4, one method for publishing rights managed digital content is shown. At step 402, the application 302 generates a content key (CK) that is used to encrypt the digital content. The content key (CK) is typically a symmetric key although any key can be used to encrypt the digital content. As is known, a symmetric key is employed by a symmetric key algorithm both to encrypt and decrypt. Accordingly, (CK) should be well-hidden when shared between a sender and a receiver.

At step 404, the application 302 encrypts the digital content with (CK) to form encrypted digital content 304 (i.e., (CK(content))). Additionally, rights data corresponding to (CK(content)) is generated, either by the publisher of the content or by another entity. Note that such rights data may be custom rights data or rights data as obtained from a pre-defined template. As was discussed above, the rights data can include a list of entities that will be entitled to consume the content, the specific rights that each of the entities possesses with respect to the content, and any conditions that may be imposed on those rights.

At step 406, the API 306 generates a second encryption key (K2), which is used to encrypt the content key (CK). Preferably, (K2) is also a symmetric key. At step 408, the API 306 encrypts (CK) with (K2) to result in (K2(CK)). At step 410, the API 306 discards (CK), with the result being that (CK) can now be obtained only by decrypting (K2 (CK)). To ensure that (CK(content)) is protected to a central DRM server 320 and that all "license requests" for the content are done centrally in accordance with the rights data, the API 306, at step 412, contacts the provided DRM server 320 and retrieves the public key (PU-DRM) thereof. At step 414, the API 306 encrypts (K2) with (PU-DRM) to result in (PU-DRM (K2)). Thus, (CK) can be protected to (PU-DRM)) to ensure that the DRM server 320 is the only entity that will be able to get access to (CK), as is required to decrypt (CK(content)). At step 416, the API 306 encrypts the rights data (i.e., the list of authorized entities and the respective rights and conditions associated with each authorized entities in the list) with (K2) to result in (K2(rightsdata)).

In an alternative embodiment, (CK) can be used to directly encrypt the rights data to result in (CK(rightsdata)), and (PU-DRM) can be used to directly encrypt (CK) to result in (PU-DRM(CK)), thereby foregoing the use of (K2) completely. However, using (K2) to encrypt the rights data and (CK) allows such (K2) to conform to any particular algorithm that might be amenable to the DRM server, whereas (CK) might be specified by an entity independent from the DRM server and might not be as amenable thereto.

At step 418, the content protection application 302 submits (PU-DRM(K2)) and (K2(rightsdata)) to the DRM server 320 as a rights label for signing. Alternatively, the client itself can sign the rights data in the manner set forth below. If the rights data is being submitted to the server for signing, then, at step 420, the DRM server 320 accesses the rights data and verifies that it can enforce the rights and conditions in the submitted rights label. To verify that it can enforce the rights data, the DRM server 320 applies the private key (PR-DRM) corresponding to (PU-DRM) to (PU-DRM(K2)) to result in (K2), and then applies (K2) to (K2(rightsdata)) to result in the rights data in the clear. The server 320 can then do any policy checks to verify that the users, rights, and conditions specified in the rights data are within any policy enforced by the server 320. The server 320 signs the originally submitted rights label including (PU-DRM(K2)) and (K2(rightsdata)) to result in the signed rights label (SRL) 308, where the signature is based on the private key of the DRM server 320 (PR-DRM), and returns the SRL 308 back to the API 306, which then presents the returned SRL 308 to the client application 302.

The SRL 308 is a digitally signed document, which makes it tamper-resistant. Additionally, the SRL 308 is independent of the actual key type and algorithm used to encrypt the content but maintains the strong 1-1 relation to the content it is protecting. Referring now to FIG. 4A, in one embodiment of the present invention, the SRL 308 may include information on the content that is the basis of the SRL 308, including perhaps an ID of the content; information on the DRM server that signs the SRL 308, including (PU-DRM (K2)) and referral information such as a URL for locating the DRM server on a network and fall-back information if the URL fails; information describing the SRL 308 itself; (K2 (rightsdata)): (K2(CK)); and a digital signature (S (PR-DRM)), among other things.

By ensuring that a trusted entity signs the rights data to create a signed rights label 308, the DRM server 320 is asserting that it will issue licenses for the content in accordance with the terms set forth by the publisher as described in the rights data of the rights label 308. As should be appreciated, a user is required to obtain a license to render the content, especially in as much as the license contains the content key (CK). When a user wants to obtain a license for the encrypted content, the user can present a license request including the SRL 308 for the content and a certificate verifying the user's credentials to the DRM server 320 or other license issuing entity. The license issuing entity can then decrypt (PU-DRM(K2)) and (K2(rightsdata)) to produce the rights data, list all the rights granted by the author (if any) to the license requesting entity, and construct a license with only those specific rights.

As set forth above, upon the application 302 receiving the SRL 308, such application 302 concatenates the signed rights label 308 with the corresponding (CK(content)) 304 to form rights managed digital content. Alternatively, the rights data is stored in a known location, with a reference to that location provided with the encrypted digital content. Thus, a rendering application that is DRM-enabled can discover the signed rights label 308 via the piece of content the rendering application is attempting to render. This discovery triggers the rendering application to initiate a license request against the DRM licensing server 320. Publishing application 302 can store a URL to the DRM licensing server 320, for example, or the DRM licensing server 320 can embed its own URL as a piece of metadata into the rights label before digitally signing it, so that the DRM client API 306 called by the rendering application can identify the correct DRM licensing server 320.

Obtaining a License for the Published Content

Figure 5:
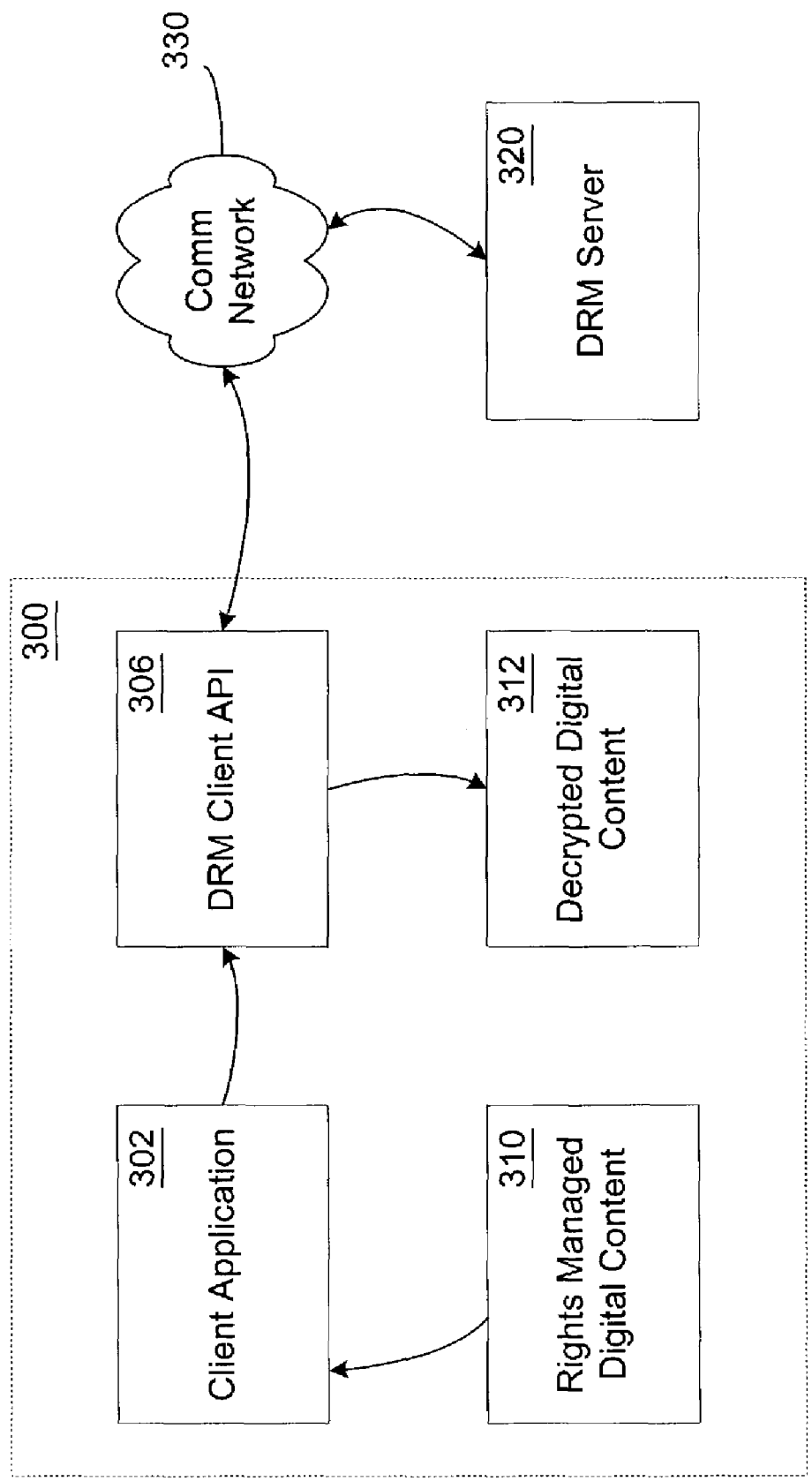
FIG. 5 is a block diagram of a preferred embodiment of a system and method according to the invention for licensing rights managed digital content.

Referring now to FIG. 5, a system and method for licensing rights managed digital content is shown. "Licensing," as that term is used herein, refers to a process that an application or service follows to request and receive a license that will enable an entity named in the license to consume the content in accordance with the terms specified in the license. Inputs to the licensing process can include the signed rights label (SRL) 308 associated with the content for which a license is being requested, and the public key certificate(s) of the entity(s) for which the license is being requested. Note that the entity requesting a license need not necessarily be the entity for which the license is being requested. Typically, a license includes the rights description from the SRL 308, an encrypted key that can decrypt the encrypted content, and a digital signature over the rights description and the encrypted key to assert legitimacy and prevent tampering.

Preliminarily, the client API 306 forwards the signed rights label 308 of the rights managed content 310 to the DRM server 320 via the communication network 330. As described above, the rights label 308 contains the content key (CK) encrypted according to the public key of the DRM server 320 (PU-DRM) (i.e., (PU-DRM(CK))). In the process of issuing a license, then, the DRM server 320 applies (PR-DRM) to (PU-DRM(CK)) to obtain (CK). It then uses the public key (PU-ENTITY) in the public key certificate that is passed up in the license request to re-encrypt (CK) (i.e., (PU-ENTITY(CK))). The newly encrypted (PU-ENTITY(CK)) is then placed into the license. Thus, the license can be returned to the caller without risk of exposing (CK), since only the holder of the private key (PR-ENTITY) corresponding to (PU-ENTITY) can recover (CK) from (PU-ENTITY(CK)). The client API 306 then uses (CK) to decrypt the encrypted content to form decrypted digital content 312. The client application 302 can then use the decrypted digital content 312 according to the rights that are provided in the license.

Alternatively, and as set forth below in more detail, a client such as the publishing client can for example issue a use license to itself to consume the content.

Figure 6A:
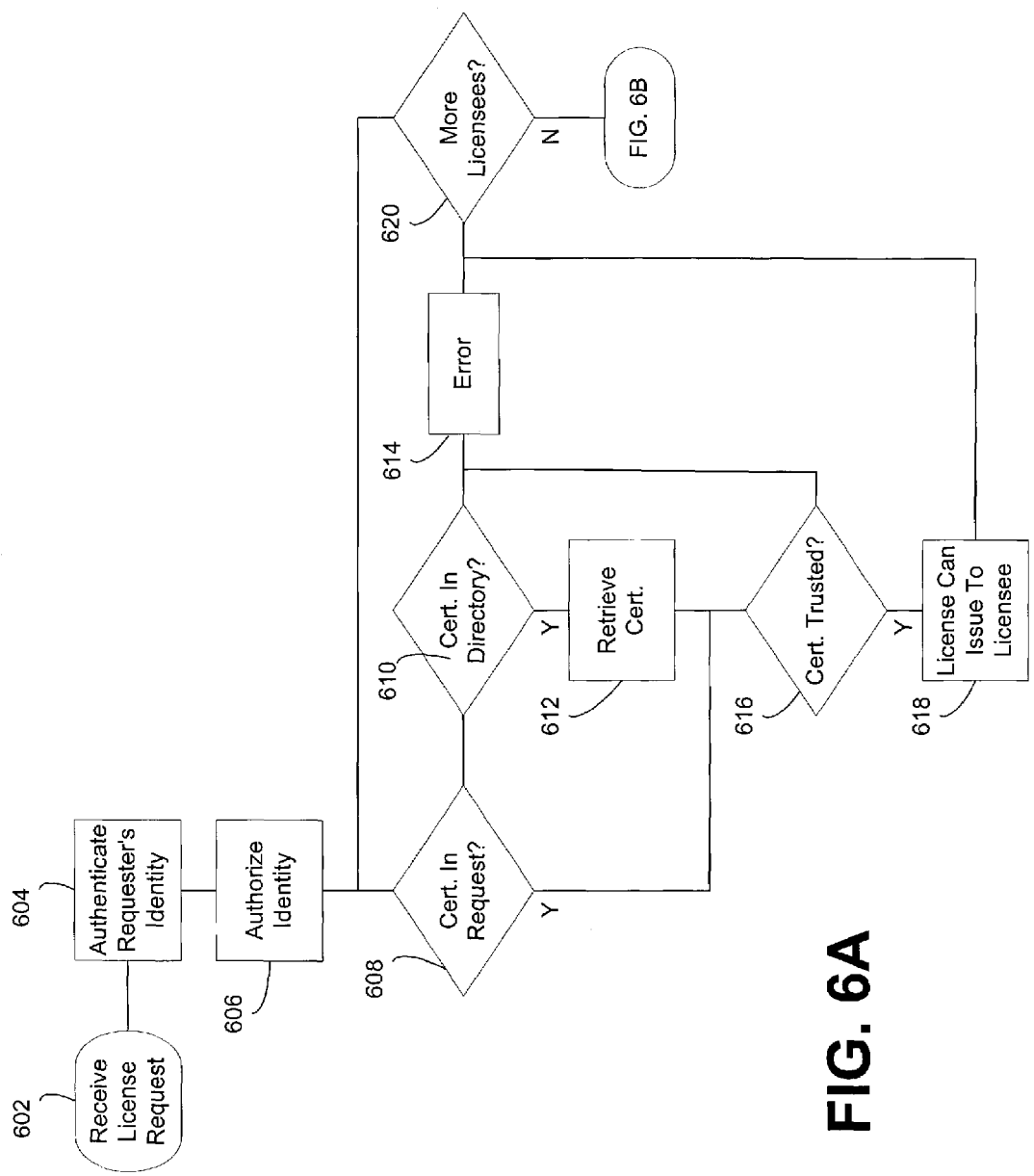
FIGS. 6A and 6B are flowcharts of a preferred embodiment of a method according to the invention for licensing rights managed digital content.
Figure 6B:
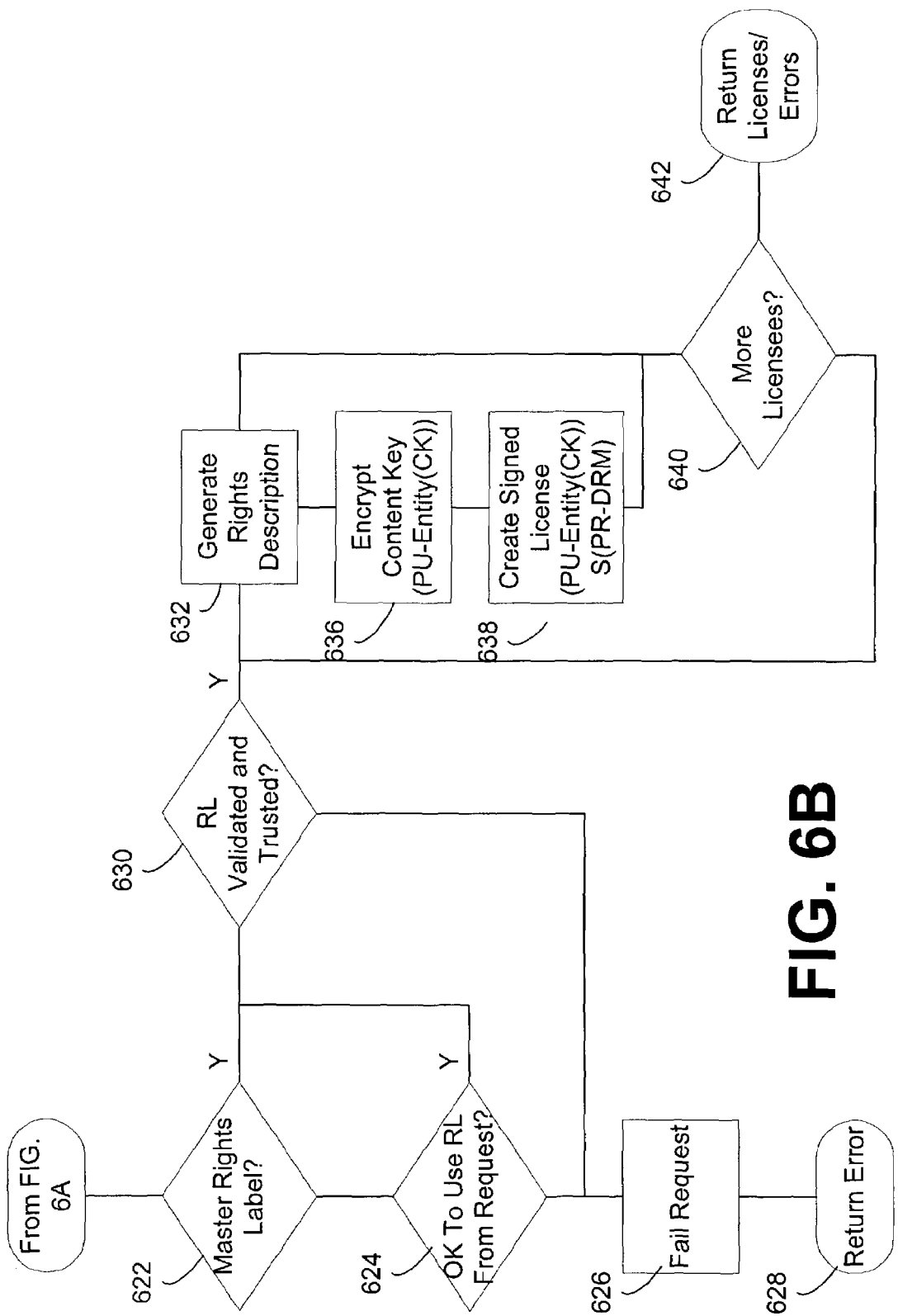

Turning now to FIGS. 6A and 6B, a method for licensing rights managed digital content is shown. At step 602, a license issuing entity such as a DRM server 320 receives a license request including either a public key certificate or an identity for each of one or more requested licensees. Presumably, if am identity is specified, the DRM server 320 can procure a corresponding public key certificate from a directory, a database, or the like. If a license is requested for only one licensee, only one certificate or identity is named. If a license is requested for a plurality of licensees, a certificate or an identity can be named for each potential licensee. At step 604, the requesting entity (i.e., the entity making the license request) is authenticated, if desired. At step 606, it is determined whether the entity is allowed to request a license, again if desired.

If, at step 608, the issuing entity determines that the public key certificate is not included in the license request, then the issuing entity uses the specified identity to perform a lookup in a directory service or database for the appropriate public key certificate. If, at step 610, the issuing entity determines that the certificate is in the directory, then, at step 612, the certificate is retrieved. If a certificate cannot be found for a given potential licensee, either in the request or in the directory, then the license server does not generate a license for that potential licensee and, at step 614, an error is returned to the requesting entity.

Assuming the DRM server 320 has a public key certificate for at least one potential licensee, then, at step 616, such DRM server 320 validates the trust of each licensee certificate. If not validated, the DRM server 320 determines that the issuer of the licensee certificate is not in the list of trusted issuers, then the request fails for that licensee, and an error is generated at step 614. Thus, any potential licensee whose certificate is not issued by a trusted issuer would not receive a license.

Additionally, the DRM server 320 preferably performs digital signature validation on all entities in the certificate chain going from the trusted issuer certificates to the individual licensee public key certificates. The process of validating the digital signatures in a chain is a well-known algorithm. If the public key certificate for a given potential licensee does not validate, or a certificate in the chain does not validate, the potential licensee is not trusted, and a license, therefore, is not issued to that potential licensee. Otherwise, at step 618, a license can issue. The process repeats at step 620 until all entities for which a license has been requested have been processed.

As shown in FIG. 6B, the DRM server 320 proceeds to validate the signed rights label 308 that is received in the license request. In one embodiment, the DRM server 320 has a master copy of every rights label signed thereby. At license time (at step 622), then, the DRM server 320 may retrieve a copy of the master rights label. The master rights label could be more up to date than the copy of the rights label sent in the license request, and therefore will be the rights label employed to produce the requested license. If no master rights label is found the DRM server 320, at step 624, determine according to pre-defined policy whether to issue a license based on the rights label in the request. If the policy does not allow, the license request fails at step 626, and an error is returned to the API 306 at step 628.

At step 630, the DRM server 320 validates the SRL 308 and specifically the digital signature thereof. If the SRL 308 does not validate, the license request fails at step 626, and an error is returned to the API 306 at step 628.

After all the validations have occurred, the DRM server constructs a license for each approved license based on the SRL 308. At step 632, the DRM server 320 generates a respective rights description for the license to be issued to each licensee. For each licensee, the DRM server 320 evaluates the identity named in the public key certificate of that licensee against the identities named in the rights description in the rights label. At step 636, the DRM server 320 obtains (PU-DRM(K2)) and (K2(CK)) from the SRL 308 and applies (PR-DRM) to obtain (CK). The issuing entity then re-encrypts (CK) using (PU-ENTITY) from the licensee's public key certificate to result in (PU-ENTITY (CK)). At step 638, the DRM server 320 concatenates the generated rights description with (PU-ENTITY(CK)) and digitally signs the resulting data structure using (PR-DRM) (i.e., S (PR-DRM)). The signed data structure is thus the license for this particular licensee.

At step 640, the DRM server 320 determines that there are no more licenses to generate for the particular request. The generated licenses are then returned to the requesting entity, at step 642, along with an appropriate certificate chain that ties the licenses back to a trusted authority.

Self-Publishing the Signed Rights Label 308

In one embodiment of the present invention, the SRL 308 may be signed by the requesting/publishing user itself. Accordingly, such user need not contact the DRM server 320 to obtain an SRL 308 for an associated piece of content. As a result, self-publishing may also be referred to as off-line publishing. In such embodiment, the publishing user should also be able to issue itself a publisher license, especially inasmuch as the self-published content is now DRM-protected and such a publisher license is required to allow the publishing user to render the now-protected content. It should also be understood that a publishing user may be enabled to issue licenses to other users.

Figure 7:
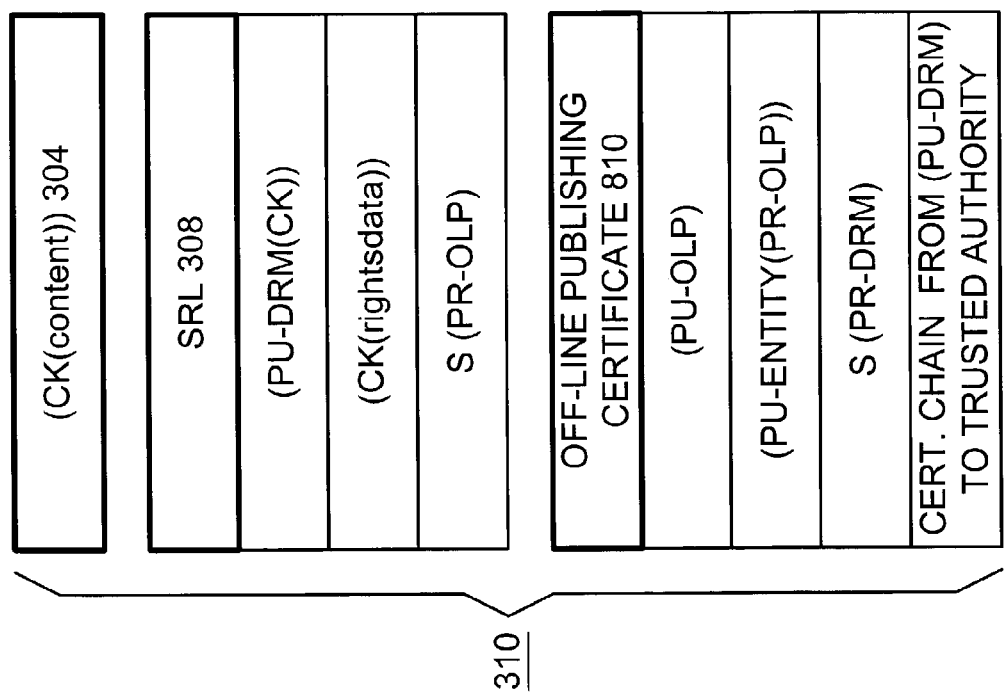
FIG. 7 is a block diagram showing a certificate issued by a DRM server to a user to allow the user to perform off-line publishing in accordance with one embodiment of the present invention.

In particular, and referring now to FIG. 7, in the embodiment, an off-line publishing user is first provisioned to off-line publish by receiving from a DRM server 320 an off-line publishing (OLP) certificate 810 including a public key (PU-OLP) and a corresponding private key (PR-OLP) encrypted according to a public key directly or indirectly accessible to the trusted component 18 (FIG. 11) of the user (PU-ENTITY) to result in (PU-ENTITY(PR-CERT)). Note that (PU-ENTITY) may for example be the public key of the trusted component 18, or may be a public key of the user which is accessible by way of the public key of the trusted component 18. The OLP certificate 810 should be signed by the private key of the DRM server 320 (PR-DRM) so that such DRM server 320 can verify such OLP certificate, as will be discussed in more detail below.

In addition, the OLP certificate 810 should include a certificate chain from (PU-DRM) back to a trusted authority that is trusted by the trusted component 18 of the publishing user or of another user so that such trusted component 18 can verify such OLP certificate 810 and any other certificate or license that is associated with such OLP certificate 810, as will be discussed below. Briefly, and as should be understood, a chain of certificates begins with a root certificate signed by the private key of a trusted authority and having the public key of the next certificate in the chain. Each intermediate certificate in the chain, then, is signed by the private key corresponding to the public key of the previous certificate in the chain, and has the public key of the next certificate in the chain. Finally, the certificate or license to which the chain is attached is signed by the private key corresponding to the public key of the last certificate in the chain.

Thus, to verify the certificate or license to which the chain is attached, knowledge of the public key corresponding to the private key of the trusted authority is gained, and such public key of the trusted authority is employed to verify the signature of the root certificate in the chain. Presuming the root certificate signature verifies, then, the public key from the root certificate is obtained and employed to verify the signature of the first intermediate certificate in the chain. The process repeats serially through the chain until every signature thereof is verified, and then the public key from the last intermediate certificate in the chain is obtained and employed to verify the signature of the certificate or license to which the chain is attached.

As should be appreciated, the OLP certificate 810 creates a link in the chain of trust between content 304 that is to be published off-line and the DRM server 320 that will issue a license for the content 304. The OLP certificate 810 may be created based on an XML/XrML language or any other appropriate language.

As should also be appreciated, the OLP certificate 810 and attached certificate chain authorizes the publishing user to self-publish. As may further be appreciated, the key pair (PU-OLP, PR-OLP) are separate from (PU-ENTITY, PR-ENTITY), and are employed specifically for self-publishing. Note that the key pair (PU-OLP, PR-OLP) may be dispensed with, in which case the DRM certificate 810 includes only the public key of the user (PU-ENTITY) and is signed by the private key of the DRM server 320 (PR-DRM) so that such DRM server 320 can verify same.

Self-publishing differs from publishing as shown in FIG. 4 in that the user essentially takes the place of the DRM server 320 with regard to steps performed thereby. Significantly, the user signs the submitted rights label including (PU-DRM(K2)) and (K2(rightsdata)) or including (PU-DRM(CK)) and (CK(rightsdata)) (the latter being shown in FIGS. 7 and 8) with (PR-OLP) as obtained from the DRM certificate 810 (i.e., S (PR-OLP)) to result in the signed rights label (SRL) 308. The trusted component 18 client in using the OLP certificate 810 typically verifies same based on the attached certificate chain. As should be appreciated, the trusted component 18 of the user obtains (PR-OLP) from the OLP certificate 810 by obtaining (PU-ENTITY(PR-OLP)) from such OLP certificate 810 and applying (PR-ENTITY) thereto. Note, though, that the publishing user cannot verify that the DRM server 320 can enforce the rights in a self-published SRL 308. Accordingly, the DRM server 320 itself should perform the verification at the time a license is requested based on the self-published SRL 308.

Once the publishing user self-publishes the SRL 308, the user concatenates such self-published SRL 308 and the OLP certificate 810 employed to produce same to the content 304, and such content 304 with SRL 308 and DRM certificate 810 is distributed as the rights managed content 310 to another user. Thereafter, the other user requests and obtains a license for the content 304/310 from the DRM server 320 in substantially the same manner as shown in FIGS. 6A and 6B. Here, though, the license-requesting user submits to the DRM server 320 both the self-published SRL 308 and the OLP certificate 810 as concatenated to the content 304. The DRM server 320 then verifies S (PR-DRM) in the OLP certificate 810 based on the corresponding (PU-DRM), and obtains (PU-OLP) from the DRM certificate 810. The DRM server 320 then verifies S (PR-OLP) in the SRL 308 based on the obtained (PU-CERT), and continues as before. Note, though, that since the publishing user did not verify that the DRM server 320 can enforce the rights in the SRL 308, and as was set forth above, the DRM server 320 itself should perform the verification at this time.

Note, too, that the DRM server 320 need only verify S (PR-DRM) in the OLP certificate 810, since presumably it trusts itself. Accordingly, the associated certificate chain from the OLP certificate 810 need not necessarily be sent to the DRM server 320 along with such OLP certificate 810, unless of course the chain is otherwise necessary, such as for example if the chain itself is at least partially the basis for S (PR-DRM).

Importantly, though, the publishing user ought to be able to render the now-protected content 304/310 without having to go to the DRM server 320 for a license. Put another way, a publishing user that off-line publishes content 304/310 without going to the DRM server 320 based on an OLP certificate 810 ought to be able to also issue itself a license in an off-line manner without going to the DRM server 320 so that such user can render the off-line published content 304/310. Accordingly, a publishing user can continue to work with self-published content 310 without any connectivity to a DRM server 320.

Figure 8:
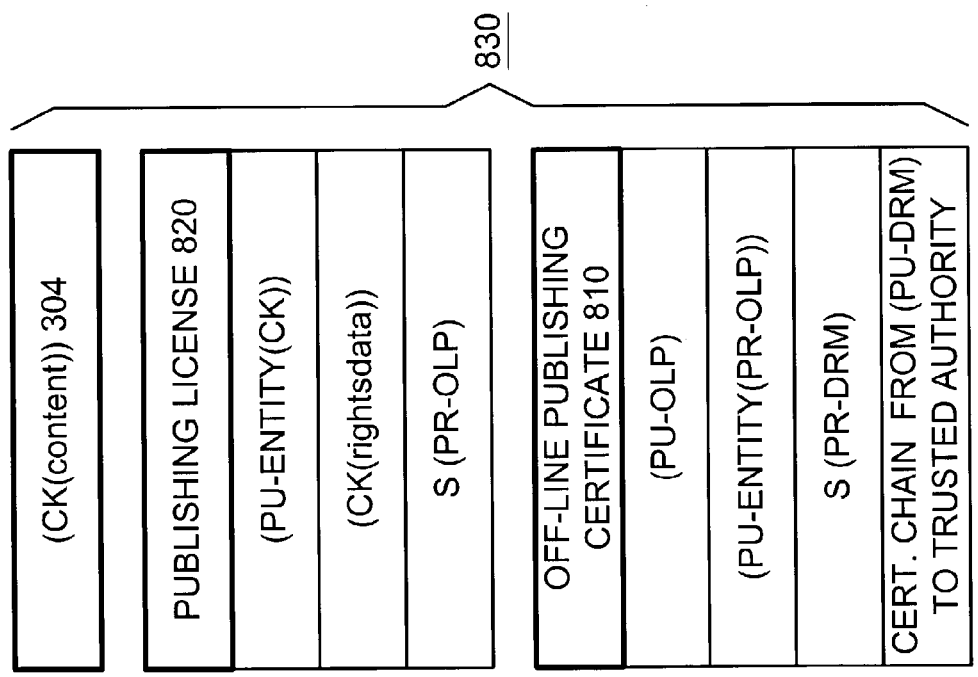
FIG. 8 is a block diagram showing the certificate of FIG. 7 along with a publisher license that allows a publishing user to render content off-line published thereby in accordance with one embodiment of the present invention.

In one embodiment of the present invention, then, and turning now to FIG. 8, a publishing user issues itself an off-line publisher license 820 signed by (PR-OLP) and based on the self-published SRL 308, and including the OLP certificate 810 and certificate chain thereof. Presumably, the publisher license 820 grants the publishing user full access to the self-published content 310, although a lesser amount of access could also be granted. The publisher license 820 may be written in an XML/XrML language or another language, as is the case with other DRM licenses. As should be appreciated, the publisher license 820 includes the content key (CK) encrypted according to (PU-ENTITY), which may be obtained by the trusted component 18 of the user's computing device 14, to form (PU-ENTITY(CK)).

The chain for the publisher license 820 thus goes from such license 820 to the OLP certificate 810 and then back to a root certificate from a trusted authority, perhaps by way of one or more intermediate certificates. Since the trusted component 18 of the user presumably can gain the public key corresponding to the private key of the trusted authority that was employed to sign the root certificate, the trusted component 18 can itself verify the publisher license 820 by way of the certificate chain thereof, and upon verification can then obtain (PU-ENTITY(CK)) therefrom, apply (PR-ENTITY) thereto to obtain (CK), and apply (CK) to (CK (content)) to result in the content 304 for purposes of rendering thereof. As a result, the publishing user can continue to work with content 310 off-line published thereby while remaining offline.

Figure 9:
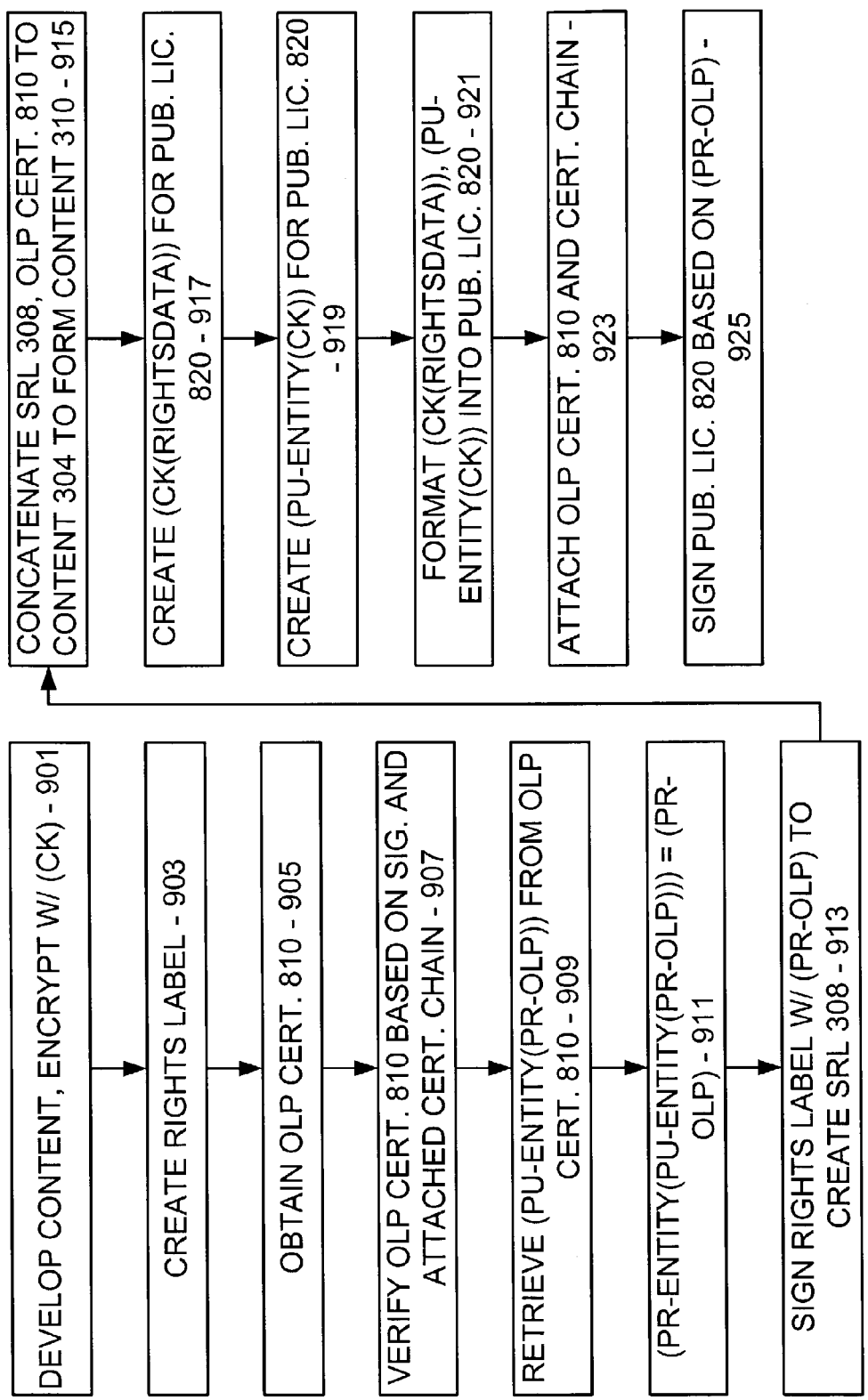
FIG. 9 is a flow chart showing key steps performed by the publishing user to obtain the publishing license of FIG. 8 in accordance with one embodiment of the present invention.

In accordance with the above, then, and referring now to FIG. 9, a publishing user off-line publishes content 304/310 and issues itself an off-line publisher license 820 for such content 304/310 in the following manner.

Preliminarily, and as should be appreciated, the content 304 is developed in an appropriate manner and encrypted according to a content key (CK) (step 901), and the publishing user creates a rights label for the content 304 with appropriate information {(PU-DRM(CK)) and (CK(rightsdata)), e.g.} (step 903). Thereafter, the publishing user, which presumably is already in possession of an OLP certificate 810 from the DRM server 320, obtains such OLP certificate 810 (step 905) and verifies same based on the signature thereof and the chain of certificates that lead back to the root authority (step 907). As should be appreciated, such verification is actually performed by a trusted component 18 on a computing device 14 of the publishing user. Assuming the verification is successful, then, the publishing user/trusted component 18 (hereinafter 'the publishing user') retrieves (PU-ENTITY(PR-OLP)) from the OLP certificate 810 step 909), applies (PR-ENTITY) to (PU-EN- TITY(PR-OLP)) to obtain (PR-OLP) (step 911), and then signs the created rights label with such (PR-OLP) to create an SRL 308 (step 913).

Thereafter, the publishing user concatenates such SRL 308 and the OLP certificate 810 employed to produce same to the content 304 to form the self-published content 310 (step 915), and such rights managed content 310 is therefore able to be distributed to another user. For the publishing user to continue using or rendering the content 310, however, such publishing user must issue itself a corresponding off-line publisher license 820.

Thus, the publishing user creates a publisher license 820 by defining appropriate rights data for itself and encrypting same according to the content key (CK) to result in (CK (rightsdata)) (step 917). Note here that such rights data may be obtained from the SRL 308 from the content 310, may be some default set of rights data granting the publishing user partial or full access to the self-published content 310, or may be derived from another source. In addition, the publishing user encrypts the content key (CK) according to (PU-ENTITY) to form (PU-ENTITY(CK)) (step 919). Such (CK(rightsdata)) and (PU-ENTITY(CK)) are then formatted into the publisher license 820 (step 921), the OLP certificate 810 and chain of certificates thereof is attached (step 923) and such publisher license 820 is signed based on (PR-OLP) as was obtained in step 911 (step 925). Note here that the content 304 (i.e., (CK(content))), the publishing license 820, and the OLP certificate in combination form a chain 830 of digital items back to the trusted authority.

Figure 10:
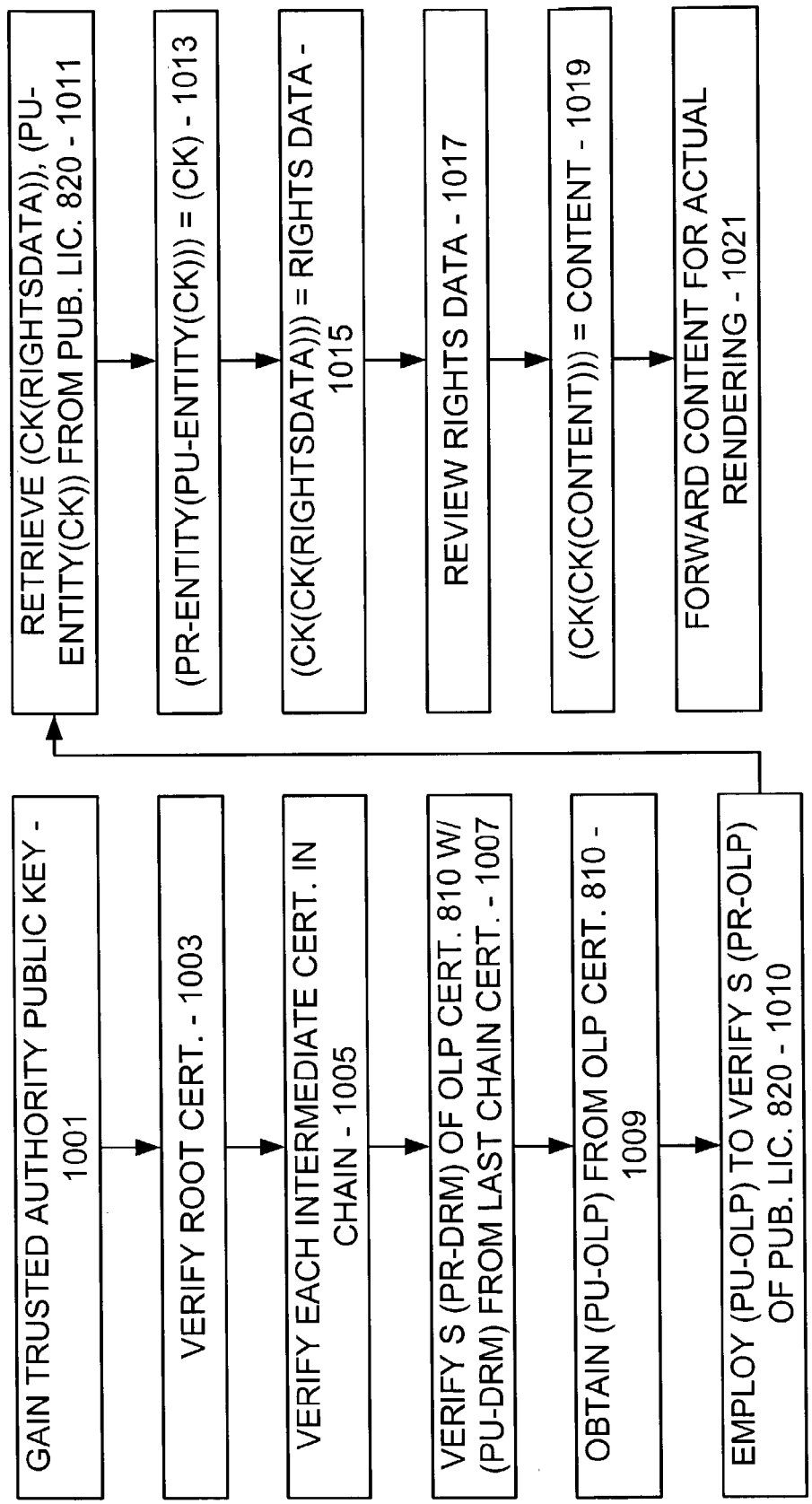
FIG. 10 is a flow chart showing key steps performed by the publishing user to employ the obtained publishing license of FIG. 9 to render the corresponding content in accordance with one embodiment of the present invention.

For the publishing user to render the published content 310, then, and turning now to FIG. 10, such publishing user need not contact the DRM server 320, but instead gains the public key corresponding to the private key of the trusted authority that was employed to sign the root certificate (step 1001), verifies the root certificate (step 1003), and then verifies each intermediate certificate in the chain (step 1005) by, for each such intermediate certificate, obtaining the public key from the previous certificate and employing same to verify the signature of such certificate. Thereafter, (PU-DRM) from the last certificate in the chain is employed to verify the signature of the OLP certificate 810 (i.e., S (PR-DRM)) (step 1007), (PU-OLP) is obtained from the OLP certificate 810 (step 1009), and such (PU-OLP) is employed to verify the signature of the publisher license 820 (i.e., S (PR-OLP)) (step 1010).

Once the publisher license 820 is verified, then, (CK (rightsdata)) and (PU-ENTITY(CK)) are retrieved from same (step 1011), (PR-ENTITY) is applied to (PU-ENTITY (CK)) to result in (CK) (step 1013), and (CK) is applied to (CK(rightsdata)) to result in the rights data (step 1015). As should now be appreciated, the rights data is reviewed by the trusted component 18 of the computing device 14 of the publishing user to determine that such rights data allows rendering in the manner sought (step 1017), such trusted component 18 thus applies (CK) to (CK(content)) from the content 310 to result in the content (step 1019), and such content is then forwarded to an appropriate rendering application for actual rendering (step 1021). Thus, the steps of FIG. 10 in effect traverse the chain 830 of digital items from the trusted authority to the content 304.

Note that the trusted component 18 could conceivably apply (CK) to (CK(content)) to result in the content without first reviewing the rights data and regardless of what the rights data may allow or disallow, but is trusted and has been constructed to in fact produce the content only after reviewing the rights data and satisfying itself that the rights data allows the rendering of such content. Once again, as a result of having the publisher license 820, the publishing user can continue to work with content 310 off-line published thereby while remaining offline inasmuch as the DRM server 320 need not be contacted.

Enrollment and Sub-Enrollment of DRM Servers

In the architecture as seen in FIG. 3, only a single DRM server 320 is shown. However, and as may be appreciated, such architecture can and likely does include multiple DRM servers 320. In particular, and in one embodiment of the present invention, such architecture includes a distributed network of DRM servers 320. Each of such DRM servers 320 may have any particular function and all of the DRM servers 320 may be organized in any appropriate manner without departing from the spirit and scope of the present invention.

Figure 12:
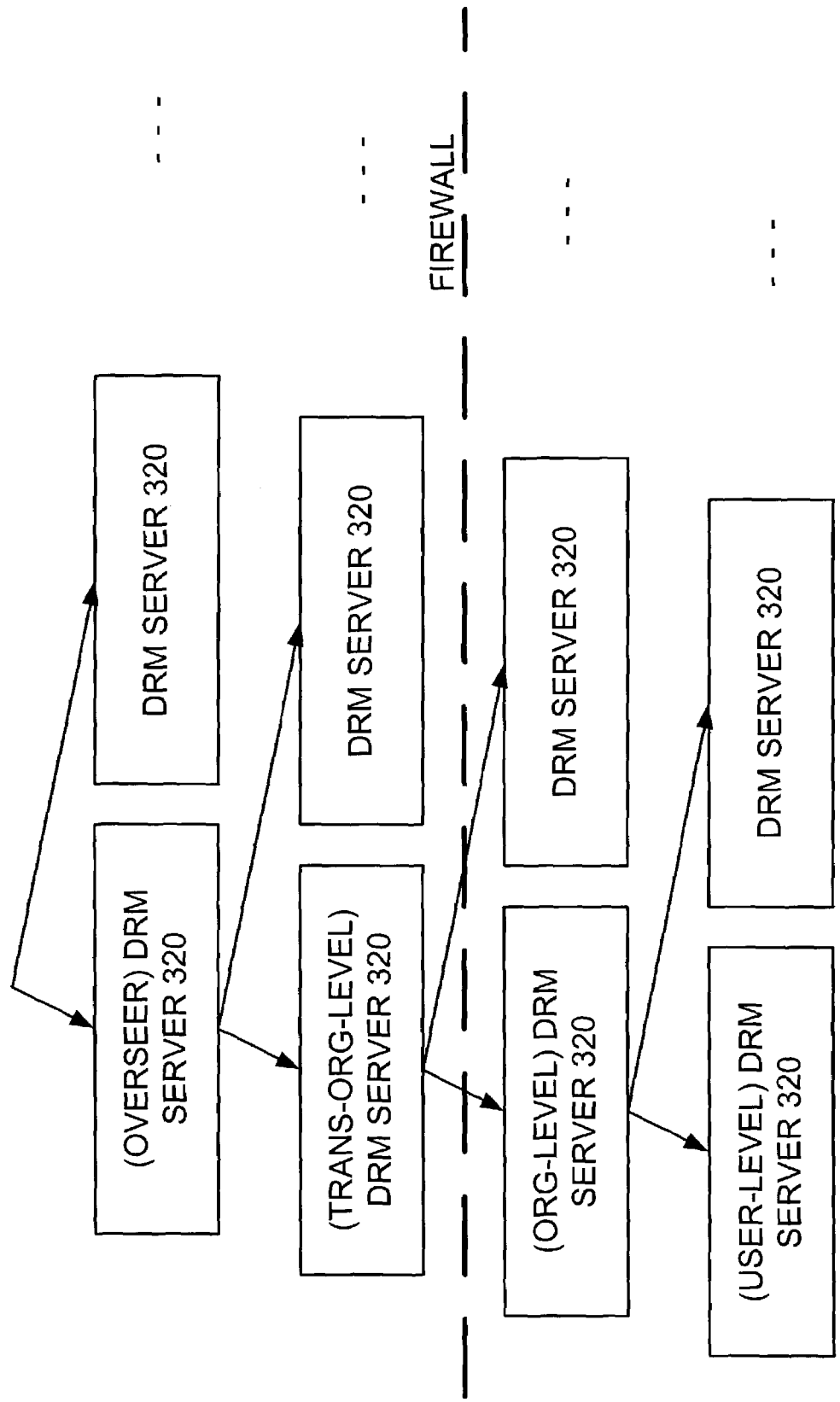
FIG. 12 is a block diagram showing a plurality of DRM servers such as may exist in the architecture of the present invention, where each (entering) DRM server is enrolled or sub-enrolled into the architecture by another (enrolling) DRM server issuing same an enrollment certificate.

For example, and turning now to FIG. 12, a particular organization may have one or more user-level DRM servers 320 for the purpose of signing rights labels to produce SRLs 308, issuing licenses 16, granting publishing licenses 320, issuing certificates to users, issuing certificates to computing devices 14, and the like. Each such user-level DRM server 320 may be geographically assigned or may be assigned based on function or load, for example. Likewise, to oversee multiple user-level DRM servers 320, an organization may have one or more management DRM servers 320. Such organization-based DRM servers 320 may be located behind an organization firewall if so desired.

In addition to organization-based DRM servers 320, there may also be trans-organization DRM servers 320 that facilitate inter-organization DRM functionality. For example, such trans-organization DRM servers 320 may allow a pair of organizations to share certain DRM content 12. Also, there may be a network of overseer DRM servers 320 that enable all other DRM servers 320. For example, such overseer DRM servers 320 may oversee and maintain all other DRM servers 320 and provide appropriate linkage for all other DRM servers 320 back to the root or trusted authority that is the basis for the chain of certificates set forth previously. Such non-organization-based DRM servers 320 are likely not located behind any organization firewall.

Critically, each DRM server 320 in the architecture of FIG. 12 must be able to prove that it is to be trusted. Thus, and as should now be appreciated from the above chain of certificates discussion, each DRM server 320 upon entering the architecture is provided with an enrollment certificate 1310, as is seen from FIG. 13. Significantly, and in one embodiment of the present invention, the enrollment certificate 1310 is provided to the entering DRM server 320 (hereinafter "the DRM-E server 320") by another 'enrolling' DRM server 320 already in the architecture (hereinafter "the DRM-R server 320"). Also significantly, attached to the provided enrollment certificate 1310 from the enrolling DRM-R server 320 is a chain of certificates 1320 including the enrollment certificate 1310 of the enrolling DRM server 320, the enrollment certificate 1310 of the DRM server 320 that enrolled the enrolling DRM-R server 320, and so on all the way back to a root DRM server 320. Such root DRM server 320 may represent the root or trusted authority, or the chain of certificates 1320 may extend beyond to reach the root or trusted authority. As should now be appreciated, such enrollment certificate 1310 and the chain of certificates 1320 in combination form the chain of certificates that are attached to an OLP certificate 810 provided by an enrolled or entered DRM-E server 320 to a publishing user, such as that shown in FIG. 8.

In one embodiment of the present invention, the enrollment certificate 1310 provided to a DRM-E server 320 by a DRM-R server 320 is in a form such as an XrML 1.2 based certificate. As may be appreciated, such type of certificate 1310 is not independently proffered by any third party, and thus such type of certificate 1310 does not represent any sort of independent vouching by a third party for the holder of such certificate 1310.

In one embodiment of the present invention, the method with which a particular DRM-E server 320 is enrolled into the architecture depends on whether the enrolling DRM-R server 320 knows or has reason to trust the entering DRM-E server 320. If not, the DRM-E server 320 should be required to prove to the DRM-R server 320 that it is trustworthy and will enforce the DRM architecture. If so, the DRM-E server 320 should not be required to prove to the DRM-R server 320 that it is trustworthy, at least not to the same degree. Thus, a non-trusting/non-knowing DRM-R server 320 'enrolls' a DRM-E server 320, while a knowing/trusting DRM-R server 320 'sub-enrolls' a DRM-E server 320.

Typically, a DRM-R server 320 knows/trusts a DRM-E server 320 if both are operated by or for the benefit of the same organization, although knowledge/trust may also arise from other situations without departing from the spirit and scope of the present invention. Thus, the method with which a particular DRM-E server 320 is enrolled into the architecture typically depends on whether the enrolling DRM-R server 320 is organizationally based or non-organizationally based. As a result, a non-organizationally based DRM-R server 320 'enrolls' a DRM-E server 320, while an organizationally based DRM-R server 320 'sub-enrolls' a DRM-E server 320.

Enrollment

Figure 14:
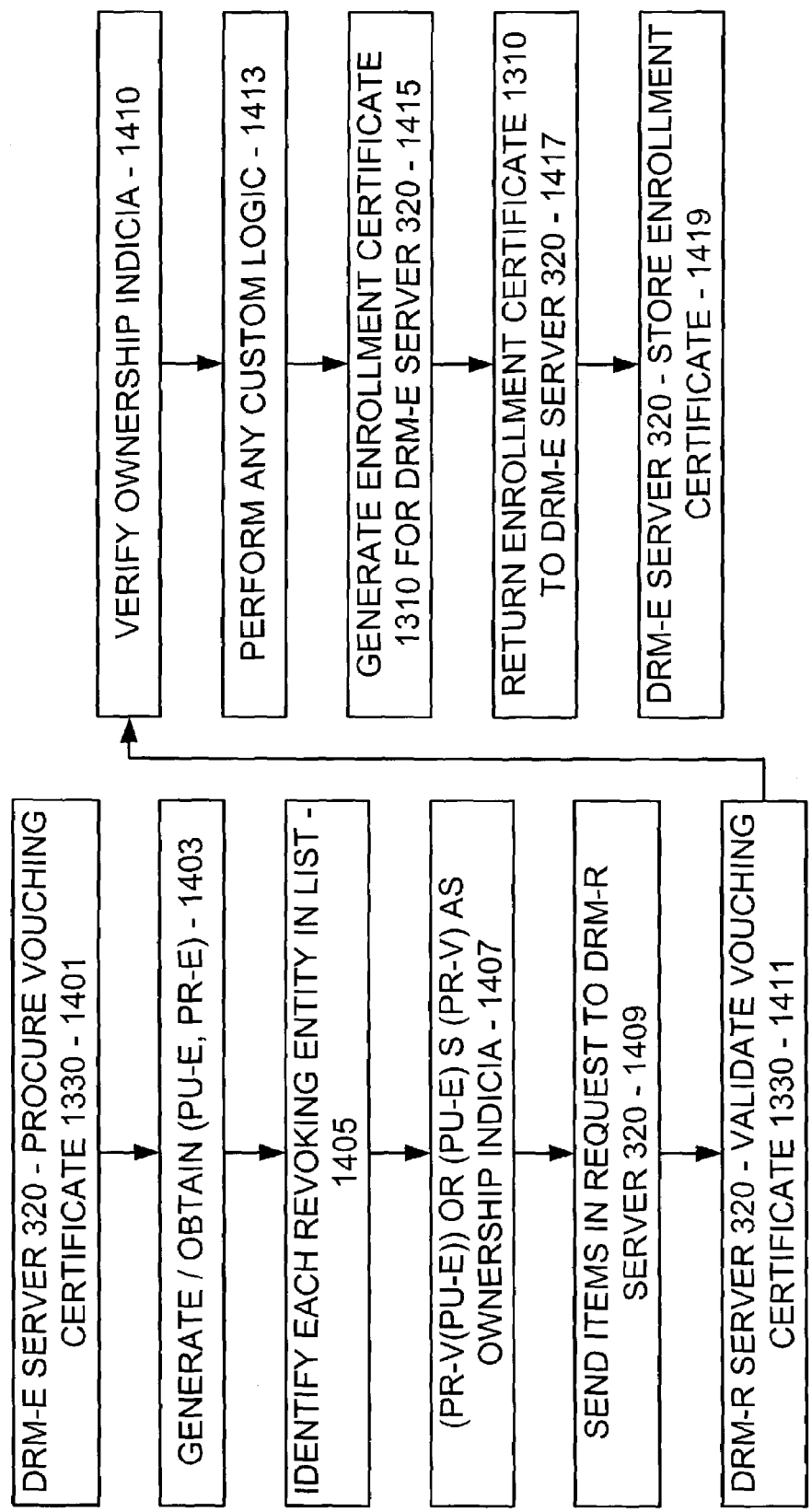
FIGS. 14 and 15 are flow diagrams showing key steps performed by the enrolling and entering DRM servers of FIGS. 13 and 14 to enroll (FIG. 14) or sub-enroll (FIG. 15) the entering DRM server.

In one embodiment of the present invention, and turning now to FIG. 14, a non-knowing/non-trusting DRM-R server 320 enrolls a DRM-E server 320 in the following manner.

Preliminary, it is to be appreciated that the DRM-E server 320 wishing to be enrolled by the non-knowing/non-trusting DRM-R server 320 is likely not known to such DRM-R server 320. Accordingly, and in one embodiment of the present invention, the DRM-E server 320 must procure a vouching certificate 1330 from a third party willing to vouch for such DRM-E server 320 (step 1401). Typically, such third party is an independent certificate-issuing agent that is trusted by the DRM-R server 320 to perform such vouching, such as for example VERISIGN Corporation of Mountain view, Calif. Such vouching certificate 1330 may for example be in a form such as an X.509 certificate. Note that in the DRM-R server 320 relying on the trusted third party to vouch for the DRM-E server 320, the liability of such DRM-R server 320 for any bad acts of the DRM-E server 320 is mitigated.

Figure 13:
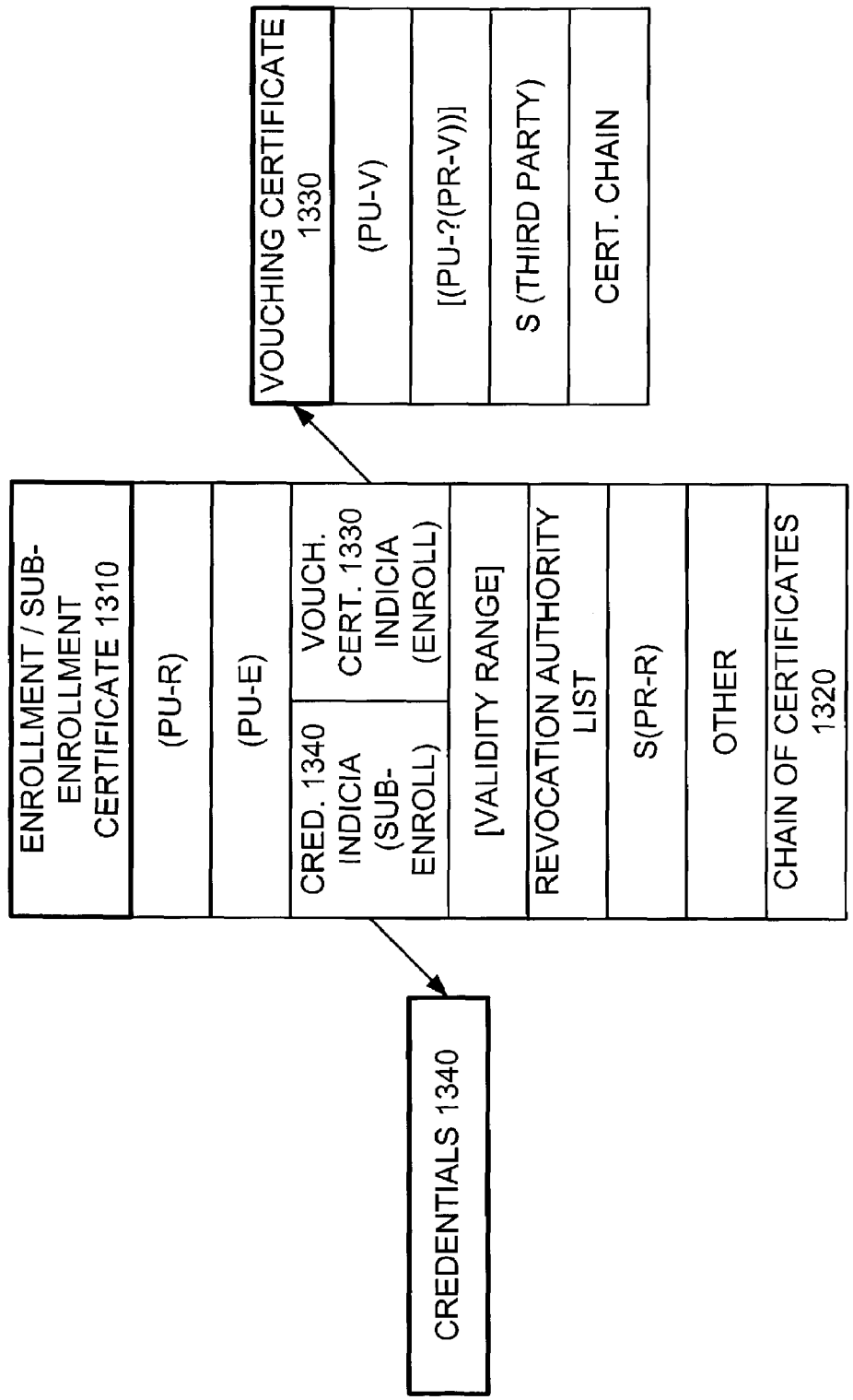
FIG. 13 is a block diagram showing the enrollment certificate of FIG. 12 along with a vouching certificate presented in at least some instances by an entering DRM server to an enrolling DRM server.

As should be appreciated and as is typical, and as is also seen in FIG. 13, the vouching certificate 1330 incorporates therein a public key (PU-V) and a corresponding private key (PR-V), is signed by the trusted third party, and may be accompanied by a chain of certificates leading to a known root for purposes of validation. As is also typical, (PR-V) within the vouching certificate 1330 is protected in a manner accessible to the vouched-for DRM-E server 320 that is the basis of the vouching certificate 1330. For example, and as seen in FIG. 13, (PR-V) could be encrypted according to an appropriate public key.

Within the DRM architecture, the entering DRM-E server 320 must have a unique identity. Here it is to be understood that the DRM identity is likely apart from (PU-V, PR-V), although the DRM identity may also coincide with such (PU-V, PR-V) without departing from the spirit and scope of the present invention. Accordingly, to establish such identity, such DRM-E server 320 generates or obtains a new public/private key pair (PU-E, PR-E) (step 1403). Also, within the DRM architecture, the enrolling DRM-E server 320 should decide which entities can revoke the authority thereof to participate. Accordingly, such DRM-E server 320 identifies each such revoking entity in a list, perhaps by way of a public key thereof (step 1405).

The DRM-E server 320 should be able to establish to the enrolling DRM-R server 320 that such DRM-E server in fact owns the vouching certificate 1330 that was obtained at step 1401. Accordingly, the DRM-E server 320 either employs (PR-V) from the vouching certificate 1330 to encrypt (PU-E) to result in (PR-V(PU-E)) as an ownership indicia, or signs (PU-E) with (PR-V) to result in (PU-E) S (PR-V) as the ownership indicia (step 1407). In either instance, applying (PU-V) to decrypt (PU-E) or verify the signature establishes possession of (PR-V) and therefore the vouching certificate 1330.

Thus far, the DRM-E server 320 has the vouching certificate 1330, (PU-E) and (PR-E), the revocation authority list, and (PR-V(PU-E)) or (PU-E) S (PR-V) as the ownership indicia. To request enrollment, then, such DRM-E server 320 sends the vouching certificate 1330, (PU-E), the revocation authority list, and (PR-V(PU-E)) or (PU-E) S (PR-V) as the ownership indicia to the DRM-R server 320 (step 1409), and the DRM-R server 320 proceeds to enroll such requesting DRM-E server 320. Note that the request or a part thereof may be in the form of a certificate signed by (PR-E).

In particular, the DRM-R server 320 validates the vouching certificate 1330 based on the signature thereof by the trusted third party and the chain of certificates leading to the known root (step 1411). Thus, the DRM-R server 320 establishes that the DRM-E server 320 has been vouched for. Also, the DRM-R server 320 verifies the ownership indicia by applying (PU-V) from the request to either decrypt (PU-E) or verify the signature and thus establish possession of (PR-V) and therefore the vouching certificate 1330 in the request (step 1410). In addition, and significantly, the DRM-R server 320 performs any custom logic necessary to decide whether to honor the request (step 1413). Such custom logic may be any appropriate logic without departing from the spirit and scope of the present invention, and may for example include a background check on the DRM-E server 320 and/or its operator, a determination of whether the DRM-E server 320 has a current trusted component 18 and/or operating system or the like, a determination of whether the DRM-E server 320 is on a revocation list or other watch list, and the like.

Assuming the custom logic permits the request to be honored, then, and in one embodiment of the present invention, the DRM-R server 320 generates the enrollment certificate 1310 for the DRM-E server 320 (step 1415). In particular, and as seen in FIG. 13. the DRM-R server 320 incorporates within the enrollment certificate 1310:

an identifier of the DRM-R server 320, such as a public key thereof (PU-R);

an identifier of the DRM-E server 320, such as (PU-E);

identifying indicia from the vouching certificate 1330 including the trusted third party that issued same, a serial number from the vouching certificate 1330, and the issuee as identified within the vouching certificate 1330;

any validity range information specifying a range during which the enrollment certificate 1310 is valid, such as for example a date range;

the revocation authority list;

a signature based on a private key of the DRM-R server 320 (PR-R) corresponding to (PU-R);

and any other appropriate information.

Such other appropriate information may include but is not limited to: the time the certificate was issued; an indication of what sort of DRM activities an enrolled server is allowed to perform such as for example all activities, account activation only, sign rights labels only, issue content licenses only, and combinations thereof; and an allowed time-range for performing DRM activities. Note that the allowed time-range is different from the validity range in that the current time must lie within the validity range to honor any certificate that includes the enrollment certificate 1310 in the certificate chain. In contrast, the issued time of child certificates must fall within allowed time-range of the parent certificate to perform DRM activities.

As should be appreciated, in generating the enrollment certificate 1310, the DRM-R server 320 may initially generate certificate information and then allow custom logic to generate additional information or modify existing information. Such custom logic may for example ensure that the DRM-R server 320 includes appropriate information, or may enforce pre-defined DRM architecture policy. Of course, the signature of the enrollment certificate 1310 is created after any such custom logic is performed. As should also be appreciated, the DRM-R server 320 attaches the chain of certificates 1320 that leads back to the trusted root authority to the generated enrollment certificate 1310 so that the generated enrollment certificate 1310 may be validated based on such chain of certificates 1320.

Note in particular that the identifying indicia from the vouching certificate 1330 as placed within the enrollment certificate 1310 will always travel with such enrollment certificate 1310 and acts as a bridge to the vouching certificate 1330. Thus, and again, such identifying indicia shows to the world that the DRM-R server 320 is relying on the trusted third party issuer of the vouching certificate 1330 to vouch for the DRM-E server 320, and the liability of such DRM-R server 320 for any bad acts of the DRM-E server 320 is mitigated.

Once the DRM-R server 320 has successfully generated the enrollment certificate 1310 with the attached chain of certificates 1320, the DRM-R server 320 then returns same to the requesting DRM-E server 320 (step 1417), and the now-enrolled DRM-E server 320 stores same in an appropriate location for future use (step 1419). As was alluded to above, (PU-E) in the enrollment certificate 1310 and the corresponding (PR-E) are the public/private key pair that the DRM-E server 320 will use as (PU-DRM) and (PR-DRM) when signing a rights label to produce an SRL 308, issuing an OLP certificate 810, and otherwise participating within the DRM architecture. Accordingly, such enrollment certificate 1310 and the chain of certificates 1320 in combination form the chain of certificates that are attached to such OLP certificate 810 and the like.

Sub-Enrollment

Figure 15:
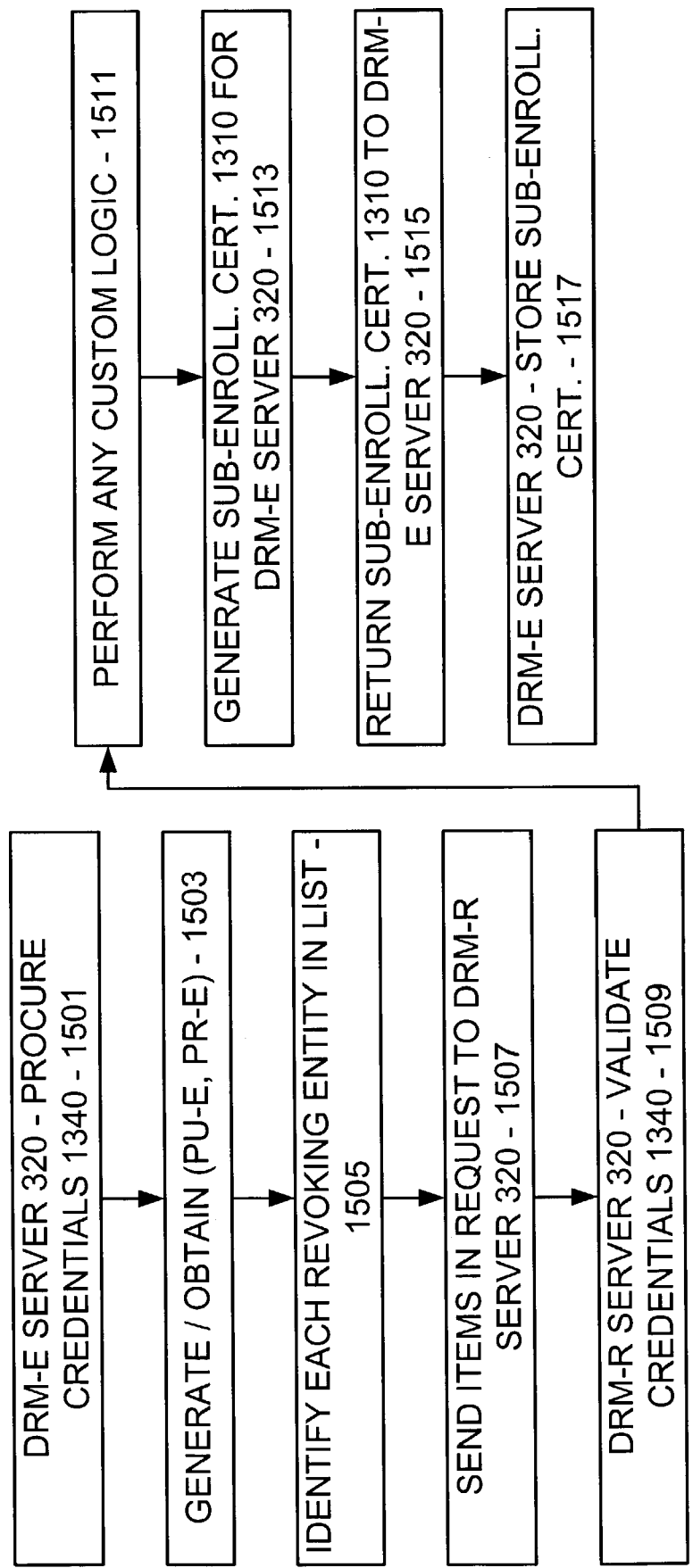

In one embodiment of the present invention, and turning now to FIG. 15, a knowing/trusting DRM-R server 320 sub-enrolls a DRM-E server 320 in the following manner.

Preliminary, it is to be appreciated that the DRM-E server 320 wishing to be sub-enrolled by the knowing/trusting DRM-R server 320 should still be required to identify itself to such DRM-R server 320 inasmuch as such knowledge or trust may not be complete. However, such identification requirement need not rise to the level of a proffer by a trusted third party inasmuch as the DRM-R server 320 does have some knowledge/trust of the DRM-E server. Accordingly, and in one embodiment of the present invention, the DRM-E server 320 obtains or is provided with some sort of credentials 1340 (FIG. 13) that are recognizable by and expected to be honored by the DRM-R server 320, and that identify the DRM-E server 320 to the satisfaction of the DRM-R server 320 (step 1501).

If both the DRM-R and DRM-E servers 320 are within the same organization, such credentials 1340 may be organization-based credentials, such as for example a network ID if both servers 320 are on a common network, a domain ID if both servers 320 share a common domain, or the like. If both the DRM-R and DRM-E servers 320 are not within the same organization, such credentials 1340 may still be a network ID if both servers 320 are on a common network, a domain ID if both servers 320 share a common domain, or the like, or may be other credentials such as for example credentials issued by a third party and recognized by the DRM-R server 320.

Note that in the present situation, the DRM-R server 320 is not relying on a trusted third party to vouch for the DRM-E server 320, and therefore the liability of such DRM-R server 320 for any bad acts of the DRM-E server 320 is not as mitigated. Nevertheless, the DRM -R server 320 is willing to take such a risk based on knowledge of or trust in the DRM-E server 320 to not in fact perform such bad acts.

As before, within the DRM architecture, the entering DRM-E server 320 must have a unique identity. Here it is to be understood that the DRM identity is likely apart from the credentials 1340, although the DRM identity may also coincide with the credentials 1340 without departing from the spirit and scope of the present invention. Accordingly, to establish such identity, such DRM-E server 320 generates or obtains a new public/private key pair (PU-E, PR-E) (step 1503). Also as before, within the DRM architecture, the sub-enrolling DRM-E server 320 should decide which entities can revoke the authority thereof to participate. Accordingly, such DRM-E server 320 identifies each such revoking entity in a list, perhaps by way of a public key thereof (step 1505).

Thus far, the DRM-E server 320 has the credentials 1340, (PU-E) and (PR-E), and the revocation authority list. To request sub-enrollment, then, such DRM-E server 320 sends the credentials 1340, (PU-E), and the revocation authority list to the DRM-R server 320 (step 1507), and the DRM-R server 320 proceeds to sub-enroll such requesting DRM-E server 320. Note that as before, the request or a part thereof may be in the form of a certificate signed by (PR-E).

In particular, the DRM-R server 320 validates the credentials 1340 based on whatever logic or resources are necessary and available to so validate (step 1509). Thus, the DRM-R server 320 establishes based on the validated credentials 1340 that the DRM-E server 320 is to be trusted to honor and obey the DRM architecture. In addition, and as before, the DRM-R server 320 performs any custom logic necessary to decide whether to honor the request (step 1511).

Assuming the custom logic permits the request to be honored, then, and in one embodiment of the present invention, the DRM-R server 320 generates a sub-enrollment certificate 1310 for the DRM-E server 320 (step 1513). In particular, and as seen in FIG. 13. the DRM-R server 320 incorporates within the sub-enrollment certificate 1310:

an identifier of the DRM-R server 320, such as a public key thereof (PU-R);

an identifier of the DRM-E server 320, such as (PU-E);

the credentials 1340 or a reference thereto;

any validity range information specifying a range during which the sub-enrollment certificate 1310 is valid, such as for example a date range;

the revocation authority list;

a signature based on a private key of the DRM-R server 320 (PR-R) corresponding to (PU-R);

and any other appropriate information.

As before, in generating the sub-enrollment certificate 1310, the DRM-R server 320 may initially generate certificate information and then allow custom logic to generate additional information or modify existing information. Again, the signature of the sub-enrollment certificate 1310 is created after any such custom logic is performed. As before, the DRM-R server 320 attaches the chain of certificates 1320 that leads back to the trusted root authority to the generated sub-enrollment certificate 1310 so that the generated sub-enrollment certificate 1310 may be validated based on such chain of certificates 1320.

Note here that the credentials 1340 or reference thereto are not believed to be especially necessary, but may nevertheless be included for completeness. Note too that the sub-enrollment certificate 1310 contains no identifying indicia from a vouching certificate 1330 inasmuch as no vouching certificate was required in the present sub-enrollment scenario.

Once the DRM-R server 320 has successfully generated the sub-enrollment certificate 1310 with the attached chain of certificates 1320, the DRM-R server 320 then returns same to the requesting DRM-E server 320 (step 1515), and the now-sub-enrolled DRM-E server 320 stores same in an appropriate location for future use (step 1517). As before, (PU-E) in the sub-enrollment certificate 1310 and the corresponding (PR-E) are the public/private key pair that the DRM-E server 320 will use as (PU-DRM) and (PR-DRM) when signing a rights label to produce an SRL 308, issuing an OLP certificate 810, and otherwise participating within the DRM architecture. Accordingly, such sub-enrollment certificate 1310 and the chain of certificates 1320 in combination form the chain of certificates that are attached to such OLP certificate 810 and the like.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a digital rights management (DRM) and enforcement architecture and method allow the controlled rendering or playing of arbitrary forms of digital content, where such control is flexible and definable by the content owner/developer of such digital content. The architecture allows and facilitates such controlled rendering, especially in an office or organization environment or the like where documents are to be shared amongst a defined group of individuals or classes of individuals. Such architecture includes a mechanism to enroll/sub-enroll approval-granting DRM servers 320 into the architecture.

It should be appreciated that changes could be made to the embodiments described above without departing from the inventive concepts thereof. For example, if a license or rights label is signed based on rights data therein, such rights data need not necessarily be encrypted. Likewise, in requesting and constructing an enrollment or sub-enrollment certificate 1310, the revocation authority list and other similar information need not necessarily be employed. It should be understood, therefore, that this invention is not limited to the particular embodiments disclosed, but it is intended to cover modifications within the spirit and scope of the present invention as defined by the appended claims.

The invention claimed is:

1. A method in combination with a Digital Rights Management (DRM) system having a plurality of DRM servers performing DRM functionality, the method of an entering DRM-E server to be enrolled into the system by an enrolling DRM-R server such that the entering DRM-E server is to be trusted within the system and comprising:

the DRM-E server procuring a public /private key pair (PU-E, PR-E) for identifying such DRM-E server within the DRM system;

the DRM-E server procuring a proffering identification thereof;

the DRM-E server sending an enrollment request to the DRMR server, the request including the proffering identification and (PU-E);

the DRM-R server validating the proffering identification;

the DRM-R server, if the request is to be honored, generating a digital enrollment certificate for the DRM-E server to enroll such DRM-E server into the DRM system;

the DRM-R server returning the generated enrollment certificate to the requesting DRM-E server; and the now-enrolled DRM-E server storing the returned enrollment certificate in an appropriate location for future use, the DRM-E server with the enrollment certificate able to employ same to issue DRM documents within the DRM system, the enrollment certificate employable to issue the DRM documents being based at least in part on (PU-E).

2. The method of claim 1 wherein the DRM-R server has no existing basis for trusting the DRM-E server, the method comprising:

the DRM-E server procuring a proffering identification thereof comprising a vouching certificate from a party willing to vouch for such DRM-E server, the vouching certificate incorporating therein a public key (PU-V) and a corresponding private key (PR-V);

the DRM-E server employing (PU-E) and (PR-V) to formulate ownership indicia to show that the DRM-E server owns the vouching certificate;

the DRM-E server sending an enrollment request to the DRM R server, the request including the vouching certificate, (PU-E), and the ownership indicia;

the DRM-R server validating the vouching certificate;

the DRM-R server verifying the ownership indicia; and the DRM-R server, if the request is to be honored, generating a digital enrollment certificate for the DRM-E server to enroll such DRM-E server into the DRM system, the generated enrollment certificate being based at least in part on the vouching certificate and (PU-E).

3. The method of claim 2 comprising the DRM-E server procuring the vouching certificate from an independent certificate-issuing agent that is trusted by and relied upon by the DRM-R server to perform such vouching.

4. The method of claim 2 comprising the DRM-E server procuring an X.509 vouching certificate.

5. The method of claim 2 comprising:
the DRM-E server procuring the vouching certificate signed by the vouching party and accompanied by a chain of certificates leading to a known root for purposes of validation; and
the DRM-R server validating the vouching certificate based on the signature thereof by the vouching party and the chain of certificates to establish that the DRM-E server has been vouched for.

6. The method of claim 2 comprising:
the DRM-E server performing one of employing (PR-V) to encrypt (PU-E) to result in (PR-V(PU-E)) as the ownership indicia, or signing (PUE) with (PR-V) to result in (PU-E) S (PR-V) as the ownership indicia; and
the DRM-R server verifying the ownership indicia by applying (PU-V) from the request to decrypt (PU-E) or verify the signature to establish that the DRM-E server owns (PR-V) and therefore the vouching certificate.

7. The method of claim 2 comprising the DRM-R server generating the enrollment certificate to include (PU-E) as an identifier of the DRME server, identifying indicia to identify the vouching certificate, and a signature based on a private key of the DRM-R server, whereby the identifying indicia for the vouching certificate in the enrollment certificate acts as a bridge to the vouching certificate and shows that the DRM-R server is trusting and relying on the vouching party to vouch for the DRM-E server.

8. The method of claim 7 comprising the DRM-R server generating the enrollment certificate to further include a public key of the DRM-R server as an identifier thereof.

9. The method of claim 7 comprising the DRM-R server generating the enrollment certificate to further include validity range information specifying a range during which the enrollment certificate is valid.

10. The method of claim 1 wherein the DRM-R server has an existing basis for trusting the DRM-E server, the method comprising:
the DRM-E server procuring a proffering identification thereof comprising credentials recognizable to and expected to be honored by the DRM-R server;
the DRM-E server sending an enrollment request to the DRMR server, the request including the credentials and (PU-E);
the DRM-R server validating the credentials; and
the DRM-R server, if the request is to be honored, generating a digital enrollment certificate for the DRM-E server to enroll such DRM-E server into the DRM system, the generated enrollment certificate being based at least in part on the credentials and (PU-E).

11. The method of claim 10 comprising the DRM-E server procuring credentials selected from a group consisting of a network ID or a domain ID, and credentials issued by a third party.

12. The method of claim 10 comprising the DRM-R server generating the enrollment certificate to include (PU-E) as an identifier of the DRME server, identifying indicia to identify the credentials, and a signature based on a private key of the DRM-R server.

13. The method of claim 12 comprising the DRM-R server generating the enrollment certificate to further include a public key of the DRM-R server as an identifier thereof.

14. The method of claim 12 comprising the DRM-R server generating the enrollment certificate to further include validity range information specifying a range during which the enrollment certificate is valid.

15. The method of claim 1 comprising the DRM-R server deciding whether to verify the request by performing a background check on the DRM-E server and/or its operator, determining whether the DRM-E server and/or a portion thereof is current, and/or determining whether the DRM-E server is on a revocation list or watch list.

16. The method of claim 1 comprising the DRM-R server generating the enrollment certificate to include (PU-E) as an identifier of the DRME server, and a signature based on a private key of the DRM-R server.

17. The method of claim 16 comprising the DRM-R server generating the enrollment certificate to further include a public key of the DRM-R server as an identifier thereof.

18. The method of claim 16 comprising the DRM-R server generating the enrollment certificate to further include validity range information specifying a range during which the enrollment certificate is valid.

19. The method of claim 16 comprising the DRM-R server generating the enrollment certificate to further include identifying indicia to identify the proffering identification.

20. The method of claim 1 further comprising the DRM-R server attaching to the generated enrollment certificate a chain of certificates that leads back to a trusted root authority so that the generated enrollment certificate may be validated based on such chain of certificates.

21. The method of claim 1 further comprising the DRM-E server identifying in a revoking authority list at least one entity with authority to revoke enrollment of such DRM-E server within the DRM system, comprising the DRM-E server sending an enrollment request to the DRM-R server, the request including the proffering identification, (PU-E), and the revocation authority list, and comprising the DRM-R server, if the request is to be honored, generating a digital enrollment certificate for the DRM-E server to enroll such DRM-E server into the DRM system, the generated enrollment certificate being based at least in part on (PU-E) and the revocation authority list.

22. The method of claim 21 comprising the DRM-E server identifying each entity in the revocation authority list by way of a public key thereof.

23. The method of claim 21 comprising the DRM-R server generating the enrollment certificate to include (PU-E) as an identifier of the DRML server, the revocation authority list from the request, and a signature based on a private key of the DRM-R server.

24. The method of claim 1 comprising the DRM-R server generating an XrML enrollment certificate.

25. A method in combination with a Digital Rights Management (DRM) system having a plurality of DRM servers performing DRM functionality, the method for an entering DRM-E server to be enrolled into the system by an enrolling DRM-R server such that the entering DRM-E server is to be trusted within the system and comprising:
the DRM-E server procuring a public/private key pair (PU-E, PR-E) for identifying such DRM-E server within the DRM system;
the DRM-E server procuring a proffering identification thereof;
the DRM-E server sending an enrollment request to the DRMR server, the request including the proffering identification and (PU-E), the DRM-R server validating the proffering identification, if the request is to be honored, generating a digital enrollment certificate for the DRM-E server to enroll such DRM-E server into the DRM system, and returning the generated enrollment certificate to the requesting DRM-E server; and the now-enrolled DRM-E server storing the returned enrollment certificate in an appropriate location for future use, the DRM-E server with the enrollment certificate able to employ same to issue DRM documents within the DRM system, the enrollment certificate employable to issue the DRM documents being based at least in part on (PU-E).

26. The method of claim 25 wherein the DRM-R server has no existing basis for trusting the DRM-E server, the method comprising:
the DRM-E server procuring a proffering identification thereof comprising a vouching certificate from a party willing to vouch for such DRM-E server, the vouching certificate incorporating therein a public key (PU-V) and a corresponding private key (PR-V);
the DRM-E server employing (PU-E) and (PR-V) to formulate ownership indicia to show that the DRM-E server owns the vouching certificate;
the DRM-E server sending an enrollment request to the DRMR server, the request including the vouching certificate, (PU-E), and the ownership indicia, the DRM-R server validating the vouching certificate, verifying the ownership indicia; and, if the request is to be honored, generating a digital enrollment certificate for the DRM-E server to enroll such DRM-E server into the DRM system, the generated enrollment certificate being based at least in part on the vouching certificate and (PU-E).

27. The method of claim 26 comprising the DRM-E server procuring the vouching certificate from an independent certificate-issuing agent that is trusted by and relied upon by the DRM-R server to perform such vouching.

28. The method of claim 26 comprising the DRM-E server procuring an X.509 vouching certificate.

29. The method of claim 26 comprising the DRM-E server procuring the vouching certificate signed by the vouching party and accompanied by a chain of certificates leading to a known root for purposes of validation, the DRM-R server validating the vouching certificate based on the signature thereof by the vouching party and the chain of certificates to establish that the DRM-E server has been vouched for.

30. The method of claim 26 comprising the DRM-E server performing one of employing (PR-V) to encrypt (PU-E) to result in (PR-V(PU-E)) as the ownership indicia, or signing (PU-E) with (PR-V) to result in (PU-E) S (PRV) as the ownership indicia, the DRM-R server verifying the ownership indicia by applying (PU-V) from the request to decrypt (PU-E) or verify the signature to establish that the DRM-E server owns (PR-V) and therefore the vouching certificate.

31. The method of claim 26 comprising the now-enrolled DRM-E server storing the returned enrollment certificate including (PU-E) as an identifier of the DRM-E server, identifying indicia to identify the vouching certificate, and a signature based on a private key of the DRM-R server, whereby the identifying indicia for the vouching certificate in the enrollment certificate acts as a bridge to the vouching certificate and shows that the DRM-R server is trusting and relying on the vouching party to vouch for the DRM-E server.

32. The method of claim 31 comprising the now-enrolled DRM-E server storing the returned enrollment certificate further including a public key of the DRM-R server as an identifier thereof.

33. The method of claim 31 comprising the now-enrolled DRM-E server storing the returned enrollment certificate further including validity range information specifying a range during which the enrollment certificate is valid.

34. The method of claim 25 wherein the D.RM-R server has an existing basis for trusting the DRM-E server, the method comprising:
the DRM-E server procuring a proffering identification thereof comprising credentials recognizable to and expected to be honored by the DRM-R server;
the DRM-E server sending an enrollment request to the DRMR server, the request including the credentials and (PU-E), the DRM-R server validating the credentials, and, if the request is to be honored, generating a digital enrollment certificate for the DRM-E server to enroll such DRM-E server into the DRM system, the generated enrollment certificate being based at least in part on the credentials and (PU-E).

35. The method of claim 34 comprising the DRM-E server procuring credentials selected from a group consisting of a network ID or a domain ID, and credentials issued by a third party.

36. The method of claim 34 comprising the now-enrolled DRM-E server storing the returned enrollment certificate including (PU-E) as an identifier of the DRM-E server, identifying indicia to identify the credentials, and a signature based on a private key of the DRM-R server.

37. The method of claim 36 comprising the now-enrolled DRM-E server storing the returned enrollment certificate further including a public key of the DRM-R server as an identifier thereof.

38. The method of claim 36 comprising the now-enrolled DRM-E server storing the returned enrollment certificate further including validity range information specifying a range during which the enrollment certificate is valid.

39. The method of claim 25 comprising the now-enrolled DRM-E server storing the returned enrollment certificate including (PU-E) as an identifier of the DRM-E server, and a signature based on a private key of the DRM-R server.

40. The method of claim 39 comprising the now-enrolled DRM-E server storing the returned enrollment certificate further including a public key of the DRM-R server as an identifier thereof.

41. The method of claim 39 comprising the now-enrolled DRM-E server storing the returned enrollment certificate further including validity range information specifying a range during which the enrollment certificate is valid.

42. The method of claim 39 comprising the now-enrolled DRM-E server storing the returned enrollment certificate further including identifying indicia to identify the proffering identification.

43. The method of claim 25 comprising the now-enrolled DRM-E server storing the returned enrollment certificate including a chain of certificates that leads back to a trusted root authority so that the generated enrollment certificate may be validated based on such chain of certificates.

44. The method of claim 25 further comprising the DRM-E server identifying in a revoking authority list at least one entity with authority to revoke enrollment of such DRM-E server within the DRM system, comprising the DRM-E server sending an enrollment request to the DRM-R server, the request including the proffering identification, (PU-E), and the revocation authority list, the DRM-R server, if the request is to be honored, generating a digital enrollment certificate for the DRM-E server to enroll such DRM-E server into the DRM system, the generated enrollment certificate being based at least in part on (PU-E) and the revocation authority list.

45. The method of claim 44 comprising the DRM-E server identifying each entity in the revocation authority list by way of a public key thereof.

46. The method of claim 44 comprising the now-enrolled DRM-E server storing the returned enrollment certificate including (PU-E) as an identifier of the DRM-E server, the revocation authority list from the request, and a signature based on a private key of the DRM-R server.

47. The method of claim 25 comprising the now-enrolled DRM-E server storing the returned enrollment certificate storing an XrML enrollment certificate.

48. A method in combination with a Digital Rights Management (DRM) system having a plurality of DRM servers performing DRM functionality, the method for an entering DRM-E server to be enrolled into the system by an enrolling DRM-R server such that the entering DRM-E server is to be trusted within the system and comprising:
the DRM-R server receiving an enrollment request from the DRM-E server including a proffering identification and a public key of the DRM-E server (PU-E) for identifying such DRM-E server within the DRM system;
the DRM-R server validating the proffering identification;
the DRM-R server, if the request is to be honored, generating a digital enrollment certificate for the DRM-E server to enroll such DRM-E server into the DRM system; and
the DRM-R server returning the generated enrollment certificate to the requesting DRM-E server, the now-enrolled DRM-E server storing the returned enrollment certificate in an appropriate location for future use, the DRM-E server with the enrollment certificate able to employ same to issue DRM documents within the DRM system, the enrollment certificate employable to issue the DRM documents being based at least in part on (PU-E).

49. The method of claim 48 wherein the DRM-R server has no existing basis for trusting the DRM-E server, the method comprising:
the DRM-R server receiving an enrollment, request from the DRM-E server including (PU-E) and a proffering identification comprising a vouching certificate from a party willing to vouch for such DRM-E server, the vouching certificate incorporating therein a public key (PU-V) and a corresponding private key (PR-V), the DRM-E server having employed (PU-E) and (PR-V) to formulate ownership indicia to show that the DRM-E server owns the vouching certificate, the enrollment request further including the ownership indicia;
the DRM-R server validating the vouching certificate;
the DRM-R server verifying the ownership indicia; and
the DRM-R server, if the request is to be honored, generating a digital enrollment certificate for the DRM-E server to enroll such DRM-E server into the DRM system, the generated enrollment certificate being based at least in part on the vouching certificate and (PU-E).

50. The method of claim 49 comprising the DRM-R server receiving an enrollment request from the DRM-E server including a vouching certificate from an independent certificate-issuing agent that is trusted by and relied upon by the DRM-R server to perform such vouching.

51. The method of claim 49 comprising the DRM-R server receiving an enrollment request from the DRM-E server including an X.509 vouching certificate.

52. The method of claim 49 comprising:
the DRM-R server receiving an enrollment request from the DRM-E server including a vouching certificate signed by the vouching party and accompanied by a chain of certificates leading to a known root for purposes of validation; and
the DRM-R server validating the vouching certificate based on the signature thereof by the vouching party and the chain of certificates to establish that the DRM-E server has been vouched for.

53. The method of claim 49 wherein the DRM-E server performs one of employing (PR-V) to encrypt (PU-E) to result in (PR-V(PU-E)) as the ownership indicia, or signing (PU-E) with (PR-V) to result in (PU-E) S (PR-V) as the ownership indicia, the method comprising the DRM-R server verifying the ownership indicia by applying (PU-V) from the request to decrypt (PU-E) or verify the signature to establish that the DRM-E server owns (PR-V) and therefore the vouching certificate.

54. The method of claim 49 comprising the DRM-R server generating the enrollment certificate to include (PU-E) as an identifier of the DRME server, identifying indicia to identify the vouching certificate, and a signature based on a private key of the DRM-R server, whereby the identifying indicia for the vouching certificate in the enrollment certificate acts as a bridge to the vouching certificate and shows that the DRM-R server is trusting and relying on the vouching party to vouch for the DRM-E server.

55. The method of claim 54 comprising the DRM-R server generating the enrollment. certificate to further include a public key of the DRM-R server as an identifier thereof.

56. The method of claim 54 comprising the DRM-R server generating the enrollment certificate to further include validity range information specifying a range during which the enrollment certificate is valid.

57. The method of claim 48 wherein the DRM-R server has an existing basis for trusting the DRM-E server, the method comprising:
the DRM-R server receiving an enrollment request from the DRM-E server including (PU-E) and a proffering identification comprising credentials recognizable to and expected to be honored by the DRM-R server;
the DRM-R server validating the credentials; and
the DRM-R server, if the request is to be honored, generating a digital enrollment certificate for the DRM-E server to enroll such DRM-E server into the DRM system, the generated enrollment certificate being based at least in part on the credentials and (PU-E).

58. The method of claim 57 comprising the DRM-R server receiving an enrollment request from the DRM-E server including credentials selected from a group consisting of a network ID or a domain ID, and credentials issued by a third party.

59. The method of claim 57 comprising the DRM-R server generating the enrollment certificate to include (PU-E) as an identifier of the DRME server, identifying indicia to identify the credentials, and a signature based on a private key of the DRM-R server.

60. The method of claim 59 comprising the DRM-R server generating the enrollment certificate to further include a public key of the DRM-R server as an identifier thereof.

61. The method of claim 59 comprising the DRM-R server generating the enrollment certificate to further include validity range information specifying a range during which the enrollment certificate is valid.

62. The method of claim 48 comprising the DRM-R server deciding whether to honor the request by performing a background check on the DRM-E server and/or its operator, determining whether the DRM-E server and/or a portion thereof is current, and/or determining whether the DRM-E server is on a revocation list or watch list.

63. The method of claim 48 comprising the DRM-R server generating the enrollment certificate to include (PU-E) as an identifier of the DRME server, and a signature based on a private key of the DRM-R server.

64. The method of claim 63 comprising the DRM-R server generating the enrollment certificate to further include a public key of the DRM-R server as an identifier thereof.

65. The method of claim 63 comprising the DRM-R server generating the enrollment certificate to further include validity range information specifying a range during which the enrollment certificate is valid.

66. The method of claim 63 comprising the DRM-R server generating the enrollment certificate to further include identifying indicia to identify the proffering identification.

67. The method of claim 48 comprising the DRM-R server generating the enrollment certificate by employing custom logic to generate at least a portion of the information in the enrollment certificate.

68. The method of claim 48 further comprising the DRM-R server attaching to the generated enrollment certificate a chain of certificates that leads back to a trusted root authority so that the generated enrollment certificate may be validated based on such chain of certificates.

69. The method of claim 48 further comprising the DRM-R server receiving an enrollment request from the DRM-E server further including a revocation authority list identifying at least one entity with authority to revoke enrollment of such DRM-E server within the DRM system, and comprising the DRM-R server, if the request is to be honored, generating a digital enrollment certificate for the DRM-E server to enroll such DRM-E server into the DRM system, the generated enrollment certificate being based at least in part on the revocation authority list.

70. The method of claim 69 comprising the DRM-R server generating the enrollment certificate to include (PU-E) as an identifier of the DRME server, the revocation authority list from the request, and a signature based on a private key of the DRM-R server.

71. The method of claim 48 comprising the DRM-R server generating an XrML enrollment certificate.

\* \* \* \* \*